US012809980B2

(12) United States Patent
Kumar et al.

(10) Patent No.: US 12,809,980 B2
(45) Date of Patent: Nov. 24, 2026

(54) DEVICE ENTITLEMENT AUTHORIZATION USING REMOTE ATTESTATION

(71) Applicant: NVIDIA Corporation, Santa Clara, CA (US)

(72) Inventors: Varun Kumar, Campbell, CA (US); Raghupathy Krishnamurthy, San Jose, CA (US); Pavan Vyas, Santa Clara, CA (US); Ryan Speiser, Slinger, WI (US)

(73) Assignee: NVIDIA Corporation, Santa Clara, CA (US)

( * ) Notice: Subject to any disclaimer, the term of this patent is extended or adjusted under 35 U.S.C. 154(b) by 55 days.

(21) Appl. No.: 18/444,372

(22) Filed: Feb. 16, 2024

(65) Prior Publication Data

US 2025/0265337 A1 Aug. 21, 2025

(51) Int. Cl.

| | |
|---|---|
| ***H04L 29/00*** | (2006.01) |
| ***G06F 21/57*** | (2013.01) |
| ***G06F 21/60*** | (2013.01) |
| ***G06F 21/62*** | (2013.01) |
| ***G06F 21/64*** | (2013.01) |

(52) U.S. Cl.

CPC ............ *G06F 21/57* (2013.01); *G06F 21/602* (2013.01); *G06F 21/62* (2013.01); *G06F 21/64* (2013.01)

(58) Field of Classification Search

CPC ........ G06F 21/57; G06F 21/602; G06F 21/62; G06F 21/64; H04L 63/083; H04L 9/3213; H04L 9/3226; H04L 9/3247; H04L 9/40; H04L 63/12

See application file for complete search history.

(56) References Cited

U.S. PATENT DOCUMENTS

| | | | | |
|---|---|---|---|---|
| 9,659,177 | B1 * | 5/2017 | Juels | H04L 63/0853 |
| 2005/0138384 | A1 * | 6/2005 | Brickell | G06F 21/57 713/182 |
| 2012/0174204 | A1 * | 7/2012 | Sturm | G06F 21/6245 709/226 |
| 2020/0026857 | A1 * | 1/2020 | Muller | G06F 21/12 |
| 2021/0266308 | A1 * | 8/2021 | Taylor | H04L 63/0861 |
| 2023/0131060 | A1 * | 4/2023 | Ko | H04L 9/3213 713/151 |
| 2023/0379699 | A1 * | 11/2023 | Oerton | H04W 12/37 |

* cited by examiner

*Primary Examiner* — Ghazal B Shehni
(74) *Attorney, Agent, or Firm* — Lowenstein Sandler LLP

(57) ABSTRACT

Apparatuses, systems, and techniques for issuing entitlement tokens to a root of trust allowing the root of trust to take certain action(s) with respect to a component that it secures, for example, to affect a change in the software and/or features available to the component it secures. In some embodiments, the entitlement token issuance process may involve receiving an attestation report corresponding to a root of trust of a computing system, wherein the attestation report is cryptographically signed using a private key unique to the root of trust, verifying the attestation report using a public key corresponding to the private key, and based at least upon successful verification of the attestation report, issuing an entitlement token for the root of trust allowing the root of trust to take one or more actions with respect to a system component secured by the root of trust.

20 Claims, 4 Drawing Sheets

DEVICE ENTITLEMENT AUTHORIZATION USING REMOTE ATTESTATION

TECHNICAL FIELD

The disclosure generally relates to the management of computing systems, and more specifically, to improved techniques for managing the software and/or features available on components of a computing system.

BACKGROUND

Modern computing systems can be extremely large and complex systems, made up of countless sub-systems and component devices used to run a broad and diverse software stack. A high-performance computing (HPC) system, for example, can include a number of different servers (e.g., one or more compute, storage, and/or management nodes) that work together to handle computationally intensive workloads (e.g., in support of artificial intelligence (AI) or other HPC applications). Each server, in turn, may include a number of different sub-systems and component devices (e.g., one or more CPU or GPU sub-systems along with various system controllers, interconnects, switches, interfaces, or other component devices), each of which may be running its own collection of software, including for example, system and/or device firmware. The different sub-systems and component devices (or components) that make up a computing system are typically placed into a secured "production" state by the component manufacturers (e.g., with secure "production" software) before they are shipped to end-customers for integration into a "production" computing system. In some situations, a component manufacturer may want to modify the software and/or features available on a component after it has been placed into production, but doing so in a safe and secure manner presents a significant challenge.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
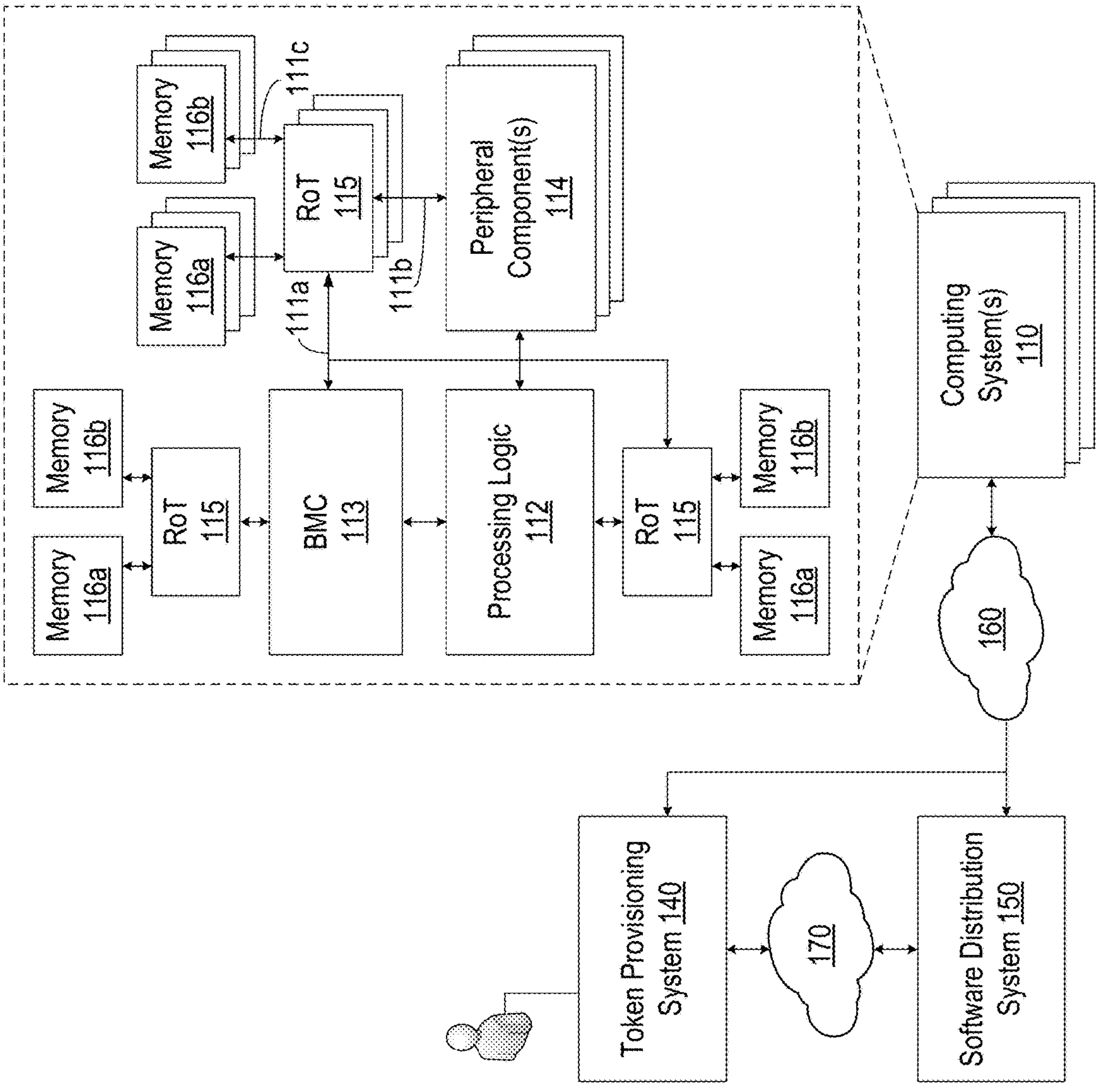
FIG. 1 illustrates a block diagram of an example computing environment, according to at least on embodiment.

Modern computing systems can be extremely large and complex systems, made up of countless sub-systems and component devices used to run a broad and diverse software stack. A high-performance computing (HPC) system, for example, can include a number of different servers (e.g., one or more compute, storage, and/or management nodes) that work together to handle computationally intensive workloads (e.g., in support of artificial intelligence (AI) or other HPC applications). Each server, in turn, may include a number of different sub-systems and component devices (e.g., one or more CPU or GPU sub-systems along with various system controllers, interconnects, switches, interfaces, or other component devices), each of which may be running its own collection of software, including for example, system and/or device firmware.

The different sub-systems and component devices (or components) that make up a computing system are frequently developed by different manufacturers and integrated by end-customers into a "production" computing system (e.g., when deploying an HPC system in a datacenter environment). System components are typically placed into a secured "production" state (e.g., with secure "production" firmware) before they are shipped to end-customers, for example, to prevent reverse engineering or other forms of exploitation or misuse. System components, for instance, are frequently secured by a root of trust (RoT), which may perform a number of different security functions and/or provide a number of different security services, including controlling the software that may be placed onto a system component (e.g., to a memory thereof), or loaded and/or executed by the system component (e.g., by an application processor thereof). A RoT, for example, may only permit a system component to load and execute trusted software code (e.g., to boot from trusted firmware, such as production firmware), which for example, may be digitally signed with an appropriate cryptographic key (e.g., using a private key of the component manufacturer, such as a production key, that is known to, or verifiable by, the RoT). In some cases, a RoT may also control the manner in which software may be executed by the system component. A RoT, for example, may control whether certain hardware and/or software features, tools, functions, modes of operation, or the like (or features) are available for use (e.g., are enabled/disabled or locked/unlocked). A RoT, for instance, may prevent certain features (e.g., otherwise present in the production firmware) from being used once a system component is placed in a production state (e.g., where the feature may expose the component to attack, adversely affect performance of the component, or be otherwise undesirable). By way of example, a RoT used to secure a processor (e.g., a central processing unit (CPU), graphics processing unit (GPU), parallel processing unit (PPU), field programmable gate array (FPGA), application specific integrated circuit (ASIC), or other form of processing logic) may disable an ultra-high frequency mode of operation, enforce a hash rate limit, or control the use of other processor features.

However, in some situations, a manufacturer may want to modify the software and/or features that are available on a system component after it has been placed into service (e.g., in a production computing system of an end-customer). A manufacturer, for instance, may want to provide special software to and/or selectively enable certain features for different end-customers. For example, while individual system components may undergo testing and validation as part of their development, some end-customers may perform their own testing and validation when deploying a production computing system. Problems invariably arise when different system components (which may be developed by different manufacturers) are brought together in a production computing system. In order to facilitate testing and validation and help assess and/or address any issues that may arise, component manufacturers may provide end-customers with special software (e.g., custom debug firmware, helpful debug tools, etc.) and/or enable certain restricted features (e.g., verbose logging, etc.). As another example, a manufacturer may restrict use of certain features when placing a system component into a production state (e.g., disabling ultra-high frequency operation, limiting hash rate computation, etc.), but may want to selectively enable those features for some end-customers (e.g., to support certain HPC applications or workloads).

Component manufacturers may affect such modifications to the components of a computing system by distributing a software update package (or software update) to the computing system, containing the special software for the components and/or software for enabling certain features on the components (e.g., a RoT firmware update), for installation by RoTs thereof. In some instances, for example, a component manufacturer may provide a software distribution service through which software updates may be requested for a computing system and its components (e.g., by an end-customer) and/or by which software updates may be distributed to a target computing system for installation by RoT(s) thereof. Before a software update can be installed, a RoT may examine the software update and/or its contents (e.g., a component firmware therein) to ensure that it is from a trusted source, for example, by verifying that it is digitally signed with an appropriate cryptographic key. In order for the software update and/or its contents to be trusted, such that the RoT will allow it to be installed, the software update and/or its contents may be signed with a cryptographic key that is already known to, or verifiable by, the RoT (e.g., for which the RoT already has a corresponding public key). As a result, manufacturers are often time forced to sign the software update and/or its contents with a production key (e.g., with the same production key that was used to sign a production firmware).

The software and/or features enabled by the software update, however, may leave a system component vulnerable to exploitation or misuse, and signing a software update and/or its contents with a production key introduces serious security risks, as there is no effective way for the component manufacturer to control use of the software update and/or its contents once distributed. A production key, for example, is typically common to all production components, such that a software update (e.g., a debug firmware) signed with the production key can be installed on any such component. By signing the software update using the production key, an unnecessarily large attack surface may be created (e.g., placing all production components at risk), when the software update may only be intended for use with a relatively small number of components (e.g., associated with a particular end-customer and/or a limited number of production systems). While it may be possible to revoke a production key (e.g., by updating a RoT firmware) when the software update is no longer needed (e.g., once testing and validation by an end-customer is complete), doing so is practically infeasible, as the revocation process would need to be performed on all production systems in which the component is used (e.g., in each and every production system in which the component is deployed) in order to ensure that the software package and/or its contents could no longer be used. Furthermore, in some cases, a component manufacturer may wish to re-enable use of the software update (e.g., if an end-customer experiences issues at a later time), but it may be difficult to do so since the production key has been revoked.

Additional security concerns are raised when the software update is provided through a software distribution service, which under traditional distribution models, may not be able to sufficiently authenticate or authorize a software and/or feature enablement request. Existing distribution techniques, for instance, may not allow the service to adequately verify what device is making the request or decide if the request should be satisfied and/or if the software update should be provided (e.g., whether the request is coming from a particular end-customer and/or production computing system, whether the component for which the software update is being provided was produced by the manufacturer and/or provided to a particular end-customer, whether the RoT that will install the software update is running a firmware version that is known to be compromised, etc.).

Embodiments of the present disclosure address the above-mentioned issues by employing a novel approach for deploying software to and/or enabling features on components of a computing system in a controlled manner. In some embodiments, for example, an entitlement token provisioning system (or provisioning system) may be used to issue entitlement tokens to a RoT, which may grant or provide the RoT with the "privilege" or authorization to take certain action(s) with respect to a component that it secures (including the RoT itself), for example, to affect a change in the software and/or configure (e.g., enable or disable) hardware and/or software features of the component (or components) it secures. In some embodiments, for instance, an entitlement token may authorize a RoT to install special software (e.g., custom firmware, tools, etc.) onto the component (e.g., onto a memory thereof), allow the component to load and execute the special software once installed (e.g., to boot from the custom firmware), and/or enable certain restricted features (e.g., in a production firmware or other existing firmware) on the system component.

In some embodiments, the provisioning system may be able to issue an entitlement token for a particular RoT of a particular computing system. In some embodiments, for example, the provisioning system may issue the entitlement token upon verification of an attestation report provided by the RoT, which may provide an attestation as to an identity and/or state of the RoT and/or a component it secures. In some embodiments, for example, the attestation report provided by the RoT may be cryptographically signed with a device-unique key of the RoT, which the provisioning system may use to verify the attestation report. In some embodiments, after the attestation report (and the identity and/or state of the RoT and/or component it secures) has been verified, the provisioning system may perform one or more policy criteria checks to determine whether the RoT should be permitted to take certain action(s) with respect to the component it secures, based on which the provisioning system may (or may not) issue an entitlement token to the RoT authorizing it to do so.

In some embodiments, for example, a provisioning system may issue entitlement tokens based on an end-to-end challenge-response performed between the provision system and one or more RoTs of a computing system. In some embodiments, for instance, a provisioning system may solicit an attestation report from each of one or more RoTs of a computing system. In some embodiments, for example, a computing system may include a baseboard management controller (BMC) that may be used to monitor and/or manage different components and corresponding RoTs of the computing system. In some embodiments, an attestation report solicitation request may be issued to a BMC of the computing system. In some embodiments, for example, an application engineer or other representative of the component manufacturer (e.g., to whom an end-customer may have reported an issue or requested special software and/or enablement of special features) may cause the provisioning system to issue an attestation report solicitation request to a BMC of the computing system. In some embodiments, the provisioning system may include an authentication challenge (e.g., a nonce generated by the provisioning system) as part of the attestation report solicitation request to be included in any attestation reports provided in response thereto. In this way, the attestation reports may be tied to a particular solicitation request, allowing the provisioning system to ensure that an attestation report is "fresh" (e.g., that it was received in response to a current solicitation request) and prevent a so-called "replay" attack.

In some embodiments, the BMC, in response to receiving an attestation report solicitation request from the provisioning system, may request an attestation report from each of the different RoTs it manages. In some embodiments, for example, the BMC may issue an attestation report request (or attestation request) to each RoT, requesting an attestation as to an identity and/or state of the RoT and/or a component it secures, which may be provided as an attestation report. In some embodiments, the BMC may include the authentication challenge from the attestation report solicitation request received by the BMC as part of the attestation request issued to the RoT for the RoT to include as part of the attestation report that it returns (e.g., to tie the attestation report to the attestation report solicitation request, as discussed above).

In some embodiments, in response to receiving an attestation request from a BMC, a RoT may generate an attestation report that includes one or more measurements, for example, regarding an identity and/or state (e.g., a current hardware and/or software state) of the RoT or a component it secures. In some embodiments, for instance, the attestation report may include a serial number of the RoT and/or the component it secures, current firmware version(s) on the RoT and/or the component it secures, and/or other measurements. In some embodiments, the attestation report may include one or more additional parameters. In some embodiments, for instance, the RoT may include the authentication challenge from the attestation request received from the BMC (which may have originated in an attestation report solicitation request from the provisioning system) as part of the attestation report (which may allow the provisioning system to tie the attestation report to the attestation report solicitation request), which may serve as an authentication response. In some embodiments, the RoT may include (another) authentication challenge (e.g., a nonce generated by the RoT) as part of the attestation report to be included in any entitlement token issued in response thereto. In this way, an entitlement token may be tied to a particular attestation report, allowing the RoT to ensure that an entitlement token is "fresh" (e.g., that it was received in response to a current attestation report) and prevent a so-called "replay" attack.

In some embodiments, the attestation report generated by a RoT may be signed with a cryptographic key that is unique to the RoT (e.g., a physical unclonable function (PUF)-based key). In doing so, the attestation report (and the measurements contained therein) may be cryptographically bound to a particular RoT and component. The attestation report may also serve as proof of possession of the RoT and component. In this way, the provisioning system upon verification of an attestation report, may be able to safely issue entitlement tokens to a particular RoT (e.g., to permit changes to the software of a system component secured thereby) and/or exercise control over their use (e.g., based on the measurements contained therein).

In some embodiments, for example, the device-unique key of the RoT may be an asymmetric key comprising a private key and public key (which may individually and collectively be referred to as a device-unique key). In some embodiments, the RoT may use the device-unique key (e.g., the device-unique private key) to sign the attestation report, which the provisioning system may be able to verify using the corresponding device-unique key (e.g., device-unique public key), which may be known or provided to the provisioning system (e.g., in a certificate (or certificate chain)). In some embodiments, for example, the RoT may compute a message digest from the attestation report using a hashing algorithm (e.g., using an MD5, SHA1, SHA256, or other hashing algorithm), which the RoT may encrypt using the device-unique key. In some embodiments, the RoT may append the encrypted message digest to (or otherwise include it with) the attestation report to sign the attestation report. In some embodiments, the RoT may provide the signed attestation report back to the BMC (e.g., in response to the initial attestation request).

In some embodiments, the BMC may aggregate the signed attestation reports received back from each RoT to generate an attestation report collection. In some embodiments, the BMC may append a signing certificate or certificate chain (certificate) to (or otherwise include it with) each attestation report containing the corresponding device-unique key (e.g., device-unique public key) of the RoT. In some embodiments, the certificate may have been provided to the BMC by the RoT (e.g., as part of establishing communication therebetween). In some embodiments, the certificate may have been issued to the RoT (e.g., when first manufactured or placed into production) by a certificate authority trusted by the BMC and/or provisioning system, such that they may be able to verify the certificate and its contents (e.g., using a public key or root certificate of the certificate authority known to the BMC and/or provisioning system).

In some embodiments, the BMC may return the attestation report collection back to the provisioning system (e.g., in response to the attestation report solicitation request). In some embodiments, the provisioning system may process each attestation report in the collection to confirm that it was properly signed, for example, verifying the certificate (or certificate chain) to confirm the device-unique public key of the RoT provided therein, verifying the signature on the attestation report using the device-unique public key, and/or verifying an authentication response included in the attestation report (e.g., to ensure that it matches the authentication challenge included in the attestation report solicitation request that was issued). In some embodiments, the provisioning system may further process each attestation report to determine whether the identity and/or state measurements contained therein satisfies one or more policy criteria (e.g., that the RoT and/or component serial number is associated with a particular end-customer, that the RoT is using the latest firmware version, etc.). In some embodiments, upon verification of the attestation report and satisfaction of the applicable policy criteria, the provisioning system may generate an entitlement token for the RoT that generated the attestation report, which may allow the RoT to take certain action(s) with respect to a component that it secures.

In some embodiments, for example, the entitlement token may allow the RoT to install special software (e.g., custom firmware, tools, etc.) onto the component (e.g., onto a memory thereof) and allow the component to load and execute the special software once installed (e.g., to boot from the custom firmware). In some embodiments, for example, an entitlement token may include a cryptographic key not previously known to the RoT (e.g., a non-production key), which can be used by the RoT to verify whether particular software can be trusted (e.g., so that it may be safely installed and/or loaded and executed by a component). This may allow a component manufacturer to sign a software update and/or its contents (e.g., a debug firmware) with a non-production private key, which a RoT may be able to verify using a corresponding non-production public key provided through an entitlement token (allowing the RoT to install the software update and/or its contents and allow a component to load and execute the software once installed). In some embodiments, the entitlement token may be used to prevent the RoT from installing certain software onto the component and/or allow the component to load and execute installed software. In some embodiments, for example, an entitlement token may identify a cryptographic key known to the RoT that is to be revoked (e.g., which may no longer be trusted), such that the software signed using the cryptographic key will no longer be verified by the RoT for installation and/or use. As another example, in some embodiments, an entitlement token may allow the RoT to configure different software and/or hardware features of the component it secures. In some embodiments, for example, the entitlement token may identify one or more restricted features and instruct the RoT to enable those features.

In some embodiments, the entitlement token may include a number of additional parameters, which a RoT may verify before the entitlement token can be used. In some embodiments, these additional parameters may operate to restrict a lifetime and/or scope of the entitlement tokens use. In some embodiments, for example, the entitlement token may include one or more identity and/or state measurements from the attestation report (e.g., a serial number of the RoT and/or the component it secures, firmware version(s) on the RoT and/or the component it secures, and/or other identity and/or state measurements), which may serve to bind the entitlement token to a particular RoT and component and/or a particular state thereof. In some embodiments, the entitlement token may include the authentication challenge provided in the attestation report, as an authentication response, which may allow the RoT to determine if the entitlement token is valid or expired (e.g., if a current authentication challenge of the RoT is the same or different, respectively). In some embodiments, the entitlement token may include other identity and/or state parameters that the RoT may verify before the entitlement token can be used, including for example, software hash values (e.g., of authorized firmware installed on the RoT and/or component it secures), supported firmware versions (e.g., minimum or maximum firmware version numbers), security version numbers, or other parameters.

In some embodiments, the provisioning system may sign the entitlement token, for example, using a cryptographic key that is already known to, or verifiable by, the RoT, such as a production key. In some embodiments, the key may be an asymmetric key comprising a private key and public key (e.g., a private production key and a public production key). In some embodiments, the provisioning system may use the private key (e.g., the private production key) to sign the attestation report, which the RoT may be able to verify using a corresponding public key (e.g., the public production key) known to the RoT (e.g., when first manufactured or placed into production). In some embodiments, for example, the provisioning system may compute a message digest from the entitlement token using a hashing algorithm (e.g., using an MD5, SHA1, SHA256, or other hashing algorithm), which the provisioning system may encrypt using the private key. In some embodiments, the provisioning system may append the resulting encrypted message digest to (or otherwise include it with) the entitlement token to sign the entitlement token.

In some embodiments, once all attestation reports have been processed, and the appropriate entitlement tokens have been generated and signed, the provisioning system may aggregate the entitlement tokens and generate an entitlement token collection. In some embodiments, the entitlement token collection may be provided to the BMC of the computing system. In some embodiments, the entitlement token collection may be provided to the BMC by the provisioning system. In other embodiments, the provisioning system may provide the entitlement token collection to a software distribution system, which may include the entitlement token collection within a software update package that may then be distributed to the BMC. In some embodiments, the software update package may include special software associated with particular entitlement tokens (e.g., which the entitlement token may authorize a RoT to install).

In some embodiments, the BMC may receive the entitlement token collection and extract and process each entitlement token contained therein. In some embodiments, for example, the BMC may determine a RoT for which it is intended (e.g., based on a RoT and/or component serial number provided therein) and provide it to the RoT for installation (e.g., as part of a token installation request). In some embodiments, where the entitlement token collection is provided within a software update, the BMC may determine that an entitlement token collection is present (within the software update) and extract it for further processing (as just described). In some embodiments, the BMC may extract and process the entitlement token collection before processing the rest of its contents (e.g., before processing any software contained therein).

In some embodiments, when a RoT receives an entitlement token from a BMC for installation (e.g., as part of a token installation request), it may examine the entitlement token to verify that it is from a trusted source and/or otherwise appropriate for installation. In some embodiments, for example, the RoT may verify the signature on the entitlement token (e.g., using a corresponding public key, such as a public production key, known to the RoT), verify that the entitlement token includes an appropriate authentication response (e.g., to ensure that it matches the authentication challenge included in the attestation report that was previously sent), and/or verify one or more additional parameters included in the entitlement token, such as identity and/or state parameters (e.g., to ensure that they match those of the RoT). In some embodiments, upon verification of the entitlement token, the RoT may install the entitlement token. In some embodiments, for example, the RoT may store the entitlement token (e.g., in a memory of the RoT) and/or determine a type of the entitlement token (e.g., indicating what action the entitlement token authorizes the RoT to take) and process the entitlement token accordingly (e.g., extracting and storing a cryptographic key contained therein, to be used when attempting to verify software for installation and/or loading and execution by a system component, or enabling one or more features identified therein).

In some embodiments, once an entitlement token is no longer needed (e.g., once testing and validation by an end-customer is complete), a BMC may issue an entitlement token uninstall request (or token removal request) requesting a RoT to uninstall an entitlement token. In some embodiments, upon receipt of the token removal request, a RoT may identify any tokens in memory and reverse the installation process with respect thereto. In some embodiments, for example, a RoT may remove a corresponding cryptographic key that had been stored, or disable one or more features that had been enabled, and remove the entitlement token from memory. In some embodiments, a BMC may be configured to issue a token removal request to each of the RoTs it manages, upon receipt of a software update (e.g., with production signed software) that does not contain an entitlement token collection, which may be understood as indicating that entitlement tokens are no longer needed (e.g., that testing and validation is complete) and that the system components are to be restored to a secure state (e.g., a production state).

As discussed above, traditional methods for distributing software to and/or enabling features on components of computing systems (e.g., via a software distribution service of a manufacturer) do not allow for adequate verification or authorization of the components before doing so. Nor do they allow for effective control over the use of the software and/or features once distributed or enabled. Embodiments of the present disclosure overcome such limitations through the use of entitlement tokens, which may authorize and/or enable RoTs that protect the components to take certain action(s) with respect to the components they secure, for example, to affect a change in the software and/or features available to the component it secures. In some embodiments, for instance, the entitlement tokens may be issued by a token provisioning system based on attestation reports provided by the RoTs, providing an attestation as to an identity and/or state of the RoTs and/or a component it secures, which may be cryptographically signed using a device-unique key of the respective RoTs that generated them. This allows the token provisioning system to not only verify that the requesting device is entitled to receive certain software and/or features (e.g., that the device is authorized, that the authorized device is in fact making the request, and/or that the authorized device is in an appropriate operating state), but also to bind the entitlement token to the requesting device and its state, allowing for control over the use of the software and/or features (e.g., limiting its lifetime and/or restricting its scope of use) even after it has been distributed and/or enabled.

FIG. 1 is a block diagram of an example computing environment 100, according to at least one embodiment. As illustrated in FIG. 1, computing environment 100 may include one or more computing system(s) 110, a token provision system 140, and (optionally, in some embodiments) a software distribution system 150.

Computing system(s) 110 may include any system used for computing (e.g., to perform computational tasks or operations), which may vary in terms of their size and complexity. In some cases, for example, a computing system 110 may be an individual server, while in others, it may be a high-performance computing (HPC) system that includes a number of different servers (e.g., one or more compute, storage, and/or management nodes). Computing system(s) 110 may each comprise a number of different sub-systems and/or component devices ("components"), each of which may be used to run its own collection of software (e.g., including its own firmware). The components of a computing system 110 (or a subset thereof) may each be secured by a corresponding root of trust (RoT), which amongst other security functions and/or services, may control the software and/or configure the hardware and/or software features of the component (or components) they secure (including of the RoTs themselves).

Token provisioning system 140 may be used to issue entitlement tokens to the RoTs of computing system(s) 110, which may authorize and/or enable the RoTs to take certain action(s) with respect to the components they secure (e.g., to affect a change in the software and/or features available on the components). In some embodiments, for instance, entitlement tokens may be issued to a RoT to allow the RoT to install special software (e.g., custom debug firmware, helpful debug tools, etc.) and/or enable certain restricted features (e.g., verbose logging, ultra-high frequency operation, unlimited hash rate computation, etc.). In some embodiments, the token provisioning system 140 may issue entitlement tokens to the RoTs of a computing system 110 based on an end-to-end challenge-response performed between the token provisioning system 140 and each of the RoTs. The entitlement tokens that are issued may be provided back to the computing system 110 for installation by appropriate RoTs thereof (e.g., to which the entitlement tokens are issued).

In some embodiments, the token provisioning system 140 may provide the entitlement tokens back to the computing system 110 itself. In other embodiments, the token provisioning system 140 may provide the entitlement tokens to a software distribution system 150, which may include the entitlement tokens within a software update package, along with one or more software objects (e.g., firmware images), that may be distributed to the computing system 110 for installation. In some embodiments, for example, the software update package may contain special software (e.g., custom debug firmware, helpful debug tools, etc.) for installation on components of the computing system along with entitlement tokens to allow the RoTs that secure those components to perform such an installation.

Additional detail regarding the structure, function, and/or operation of computing system(s) 110, token provisioning system 140, and software distribution system 150 is provided below.

Computing system(s) 110 may include any system used for computing (e.g., to perform computational tasks or operations) and may vary in terms of their size and complexity, comprising a number of different components, each of which may be used to run its own collection of software (e.g., including its own firmware). In some embodiments, for example, as illustrated in FIG. 1, a computing system 110 may include a system-level processing component, or processing logic 112, along with one or more peripheral components 114. By way of example, processing logic 112 may be or include a CPU, FPGA, ASIC, or other form of processing logic, and components 114 may be or include, one or more additional processing components (e.g., one or more graphics processing units (GPUs), parallel processing units (PPUs), data processing units (DPUs), etc.), switches (e.g., Peripheral Component Interconnect Express (PCIe) switches, NVLink switches (or NVSwitches), etc.), controllers (e.g., memory controllers, etc.), communication interfaces, or other system components. In some embodiments, each component of the computing system 110 (or a subset thereof) may be secured by a corresponding root of trust (RoT) component, RoT 115, which may perform a number of different security functions and/or provide a number of different security services with respect to the component (or components) it secures (including the RoT 115 itself). While RoTs 115 may be illustrated as discrete elements, separate from the component it secures, it will be appreciated that this need not be the case. In some embodiments, for example, a RoT 115 may be external to the component it secures, while in other embodiments, it may be integrated within or as part of the component that it secures. In some embodiments, the computing system 110 may also include a baseboard management controller (BMC) component, BMC 113, which may perform different management functions with respect to the computing system 110 and its components. Computing system(s) 110 may be coupled to, and able to communicate with, the token provisioning system 140 and/or software distribution system 150 over a communication network 160 (e.g., a local area network (LAN), a wide area network (WAN), the public Internet, and/or one or more other communication networks), for example, using a network interface (or other communication interface thereof).

In some embodiments, the components of computing system 110 (e.g., processing logic 112, BMC 113, peripheral components 114, and/or RoTs 115) may be coupled to and able to communicate with each other, for example, over a communication bus 111*a* (e.g., using communication interfaces thereof). While illustrated as a discrete communication bus 111*a*, to which the components may be coupled, communication bus 111*a* may represent a number of separate communication buses, to which some or all of the components may be coupled and over which those components may be able to communicate (e.g., using respective communication interfaces thereof). By way of example, in some embodiments, communication bus 111*a* may comprise one or more of a PCIe communication bus, an inter-integrated circuit ($I^2C$) communication bus or System Management Bus (SMBus), a serial peripheral interface (SPI) communication bus, and/or another communication bus, to which a subset (e.g., some or all) of the components may be coupled and over which they may be able to communicate (e.g., using PCIe interfaces, $I^2C$ or SMBus interfaces, SPI interfaces, and/or other communication interfaces thereof).

The components of computing system 110 may communicate with each other according to a communication protocol, or a set of communication protocols (e.g., a protocol stack), which may govern the manner in which such communication is to take place (e.g., defining the signals or messages (or other data structures) that are to be exchanged and a sequence in which they are to be exchanged, for example, to establish, conduct, and terminate communication). In some embodiments, for example, the components of computing system 110 may communicate with each other over communication bus 111*a*, at least in part, according to the PCIe protocol, the $I^2C$ or SMBus protocol, SPI protocol, or other communication protocol(s) (e.g., other physical layer and/or data-link layer protocols). In some embodiments, the components of computing system 110 may communicate with each other using one or more higher layer protocols (e.g., transport layer and/or application layer protocols) that may be implemented atop one or more lower layer protocols (e.g., atop the PCIe protocol, $I^2C$ or SMBus protocol, SPI protocol, or other physical layer and/or data-link layer protocols).

Each of the different components of computing system 110 (e.g., processing logic 112, BMC 113, peripheral components 114, and/or RoTs 115) may run its own collection of software, including for example, its own firmware. In some embodiments, for example, each component of the computing system 110 may be coupled to one or more memories (or other storage elements) on which software (a particular instance of which may be referred to as a software object, software image, or software code) for the component may be stored. By way of example, in some embodiments, a component may be coupled to a memory 116, which for example, may be a non-volatile memory, such as flash memory, on which a firmware image (or firmware images) for the component may be stored. The component may be able to load and execute (or boot from) a firmware image stored on memory 116, for example, using an application processor (or other processing logic) thereof. While memory 116 may be illustrated as being external to the component to which it is coupled, it will be appreciated that this need not be the case. In some embodiments, for example, the memory 116 may be integrated within or as part of the component to which it is coupled.

In some embodiments, a memory 116 of a component may comprise a number of logically and/or physically separate memory elements on which software for a component may be stored. For example, as illustrated in FIG. 1, memory 116 may comprise a pair of separate memory elements, memory 116*a* and memory 116*b*, each of which may be used to store a firmware image for a component. Memory 116*a*, for example, may be used to store a first firmware for the component (e.g., a primary firmware image) while memory 116*b* may be used to store a second firmware for the component (e.g., a secondary firmware image or fallback firmware image). A component may boot from the firmware in memory 116 according to a particular boot sequence. In some embodiments, for example, a component may first attempt to boot from the firmware in memory 116*a* and, if for some reason that fails, then attempt to boot from the firmware in memory 116*b*.

In some embodiments, each component of computing system 110 (or a subset thereof) may be secured by a corresponding root of trust (RoT) component, RoT 115, which may perform a number of different security functions and/or provide a number of different security services with respect to the component (or components) it secures (including the RoT 115 itself). In some embodiments, a RoT 115 may itself comprise a number of components. In some embodiments, for example, a RoT 115 may comprise RoT-level processing logic (e.g., an embedded CPU, FPGA, ASIC, or other form of processing logic), one or more memories (or other storage elements) (e.g., a read-only memory (ROM), one-time-programmable (OTP) memory, embedded non-volatile memory, such as an embedded flash memory, data registers or electronic fuses, or other secure memory or storage component thereof), one or more communication interfaces (e.g., an $I^2C$ or SMBus interface, a SPI interface, and/or other communication interface), and/or one or more other components.

In some embodiments, a RoT 115 and the component (or components) it secures may be coupled to and able to communicate with each other. In some embodiments, for instance, a RoT 115 and a component it secures may be coupled to and able to communicate with each other over a communication bus 111*b* (e.g., an $I^2C$ bus or SMBus) using respective communication interfaces thereof (e.g., an $I^2C$ or SMBus interface thereof). In some embodiments, a RoT 115 and the component it secures may communicate with each other according to a communication protocol, or a set of communication protocols (e.g., a protocol stack), which may govern the manner in which such communication is to take place. In some embodiments, for example, a RoT 115 and the component it secures may communicate with each other, at least in part, according to the $I^2C$ or SMBus protocol or other communication protocol.

In some embodiments, a RoT 115 may also be coupled to and able to communicate with a corresponding memory 116 of the component (or components) it secures (including of the RoT 115 itself). In some embodiments, for example, a RoT 115 and a memory 116 may be coupled to and able to communicate with each other over a communication bus 111*c* (e.g., a SPI bus) using respective communication interfaces thereof (e.g., SPI interfaces thereof). In some embodiments, a RoT 115 may communicate with memory 116 according to a communication protocol, or a set of communication protocols (e.g., a protocol stack), which may govern the manner in which such communication is to take place. In some embodiments, for example, a RoT 115 may communicate with memory 116, at least in part, according to the SPI protocol or other communication protocol. In some embodiments, a RoT 115 may secure the memory 116 associated with the component. In some embodiments, for example, memory 116 may be accessed via the RoT 115. By way of example, a component may load a software object (e.g., a firmware image) from memory 116 by issuing requests or commands to the RoT 115 and receiving responses therefrom. As another example, a BMC 113 may install a software object (e.g., a firmware image) to memory 116 by issuing requests or commands to the RoT 115.

In some embodiments, a RoT 115 may allow for external management of the RoT 115 itself, a component it secures, and/or a memory 116 thereof (e.g., of the RoT 115 and/or a component it secures). In some embodiments, for example, a RoT 115 may be externally managed by a management controller of the computing system 110, such as BMC 113. In some embodiments, for example, BMC 113 may be coupled to and able to communicate with a RoT 115 over communication bus 111*a* (e.g., over an $I^2C$ bus or SMBus or SPI bus) using respective communication interfaces thereof (e.g., an $I^2C$ or SMBus interface or SPI interface thereof). In some embodiments, a RoT 115 and BMC 113 may communicate with each other according to a communication protocol, or a set of communication protocols (e.g., a protocol stack), which may govern the manner in which such communication is to take place.

In some embodiments, for example, a RoT 115 and BMC 113 may communicate with each other, at least in part, according to the $I^2C$ or SMBus protocol, the SPI protocol, or other communication protocol. In some embodiments, a RoT 115 and BMC 113 may employ one or more higher layer protocols (e.g., transport and/or application layer protocols) that may be implemented atop one or more lower layer protocols (e.g., atop the $I^2C$ or SMBus protocol, the SPI protocol, or other physical layer and/or data-link layer protocols). In some embodiments, for example, a RoT 115 and BMC 113 may communicate with each other, at least in part, according to one or more standards developed and maintained by the Distributed Management Task Force (DMTF), which may promulgate standards for management of computing systems, like computing system(s) 110, and their components.

In some embodiments, for example, a RoT 115 and BMC 113 may communicate with each other according to the Management Component Transport Protocol (MCTP). The MCTP protocol may be used to facilitate communication between management controllers, such as BMC 113, and the different components it may be responsible for managing, for example, to support different management functions (e.g., monitoring and control functions). The MCTP protocol is an extensible protocol, which for example, supports the use of vendor defined messages. The MCTP protocol is a transport protocol (or transport layer protocol) that may be used over different underlying communication buses. The MCTP protocol may be implemented on top of one or more other protocols, for example, atop different physical and/or data-link layer protocols (e.g., $I^2C$ or SMBus protocol, SPI protocol, PCIe protocol, etc.) and may support one or more higher layer protocols.

In some embodiments, for example, a RoT 115 and BMC 113 may communicate with each other according to the Platform Level Data Model (PLDM) standard (e.g., including the base specification and/or extensions thereof) and/or the Security Protocols and Data Models (SPDM) standard, which may be implemented atop the MCTP protocol. The PLDM standard may define messages, data structures, and/or message exchange sequences for performing different management-related functions (e.g., for transferring a software object from the BMC 113 to a RoT 115 and/or updating the software on a RoT 115 and/or a component it secures). The SPDM standard may define messages, data structures, and/or message exchange sequences for performing different security-related functions (e.g., for establishing a secure communication session between the BMC 113 and a RoT 115, authenticating a hardware identity of a RoT 115 and/or a component it secures, and/or measurement of a software identity of a RoT 115 and/or a component it secures).

As noted above, a RoT 115 may perform a number of different security functions and/or provide a number of different security services with respect to the component (or components) it secures (including with respect to the RoT 115 itself). In some embodiments, for example, a RoT 115 may perform or provide different storage, verification, update, measurement, and/or reporting functions and services with respect to a component it secures (including the RoT 115 itself). In some embodiments, for instance, a RoT 115 may control the software that may be loaded by the component (e.g., from memory 116) and/or executed by the component (e.g., by an application processor thereof). In some embodiments, for example, a RoT 115 may only allow a component (including the RoT 115 itself) to load and/or execute trusted software code (e.g., a trusted firmware image or software object). Software code, for example, may be digitally signed using a cryptographic key, which may be tied to (e.g., uniquely associated with) a particular entity or organization and may serve to establish a provenance of the software code. A RoT 115 may verify the digital signature, to ensure that the software code can be trusted, before allowing it to be loaded and/or executed. In some embodiments, for example, a RoT 115 may have one or more cryptographic keys (e.g., stored in a secure memory thereof, for instance, within a key store therein), which the RoT 115 may use to verify the digital signature to establish its trustworthiness, or lack thereof.

An entity or organization, such as the component manufacturer, for example, may generate (or otherwise be uniquely associated with) a cryptographic key. In some embodiments, for instance, the cryptographic key (or key) may be an asymmetric cryptographic key, comprising a private key and corresponding public key (which may individually and collectively be referred to as a cryptographic key). The cryptographic key (e.g., a public key) may be provided to the RoT 115 and stored therein (e.g., when the RoT 115 and/or component it secures is first manufactured or placed into production). In some embodiments, for example, the cryptographic key (e.g., the public key) may be stored in a secure memory thereof (e.g., in a read-only memory (ROM), one-time-programmable (OTP) memory, embedded non-volatile memory, such as an embedded flash memory, or other secure memory or storage component thereof), for example, as part of a secure key store therein. A software object may be signed using the cryptographic key (e.g., using a corresponding private key), with a digital signature being appended to (or otherwise coupled to) the software object in the process. The RoT 115 may be able to verify the digital signature of the software object using the cryptographic key stored thereon (e.g., the stored public key).

In some embodiments, a RoT 115 may control operation of the component it secures. In some embodiments, a RoT 115 may control a manner in which software may be executed by the component it secures and/or a manner in which hardware of the component it secures may be used. In some embodiments, for example, a RoT 115 may control whether certain hardware and/or software features, tools, functions, modes of operation, or the like ("features") are available for use (e.g., are enabled/disabled or locked/unlocked) on the component it secures. In some embodiments, for instance, a RoT 115 may prevent certain features of a software object (e.g., features that are otherwise present in a firmware image) from being used by the component (e.g., where the feature may expose the component to attack, adversely affect performance of the component, or be otherwise undesirable). In some embodiments, for example, an application processor (or other processing logic) of the component may communicate with the RoT 115 to determine what features are enabled/disabled and may adjust operation accordingly, for example, by enabling/disabling appropriate features at runtime. By way of example, in some embodiments, a RoT 115 may control whether fuse updates can be performed on the component it secures, whether cryptographic certificates can be changed on the component it secures, and/or pre-boot attestation can be performed on the component it secures. As additional examples, in some embodiments, a RoT 115 may control whether a communication interface of the component can be used (e.g., whether a UART interface is enabled) and/or whether different network services are active (e.g., whether a secure shell is enabled).

In some embodiments, a RoT 115 may control the software that may be installed (or loaded) onto a component it secures (including the RoT 115 itself), for example, onto memory 116 associated therewith. In some embodiments, for example, a RoT 115 may only allow trusted software to be installed onto a component it secures. In some embodiments, for example, a RoT 115 may receive a software object (e.g., a firmware image or other software object) for installation onto a component it secures. The software object may be digitally signed using a cryptographic key, which may be tied to (e.g., uniquely associated with) a particular entity or organization and may serve to establish a provenance of the software object. A RoT 115 may verify the digital signature, to ensure that the software object can be trusted, before storing it in memory 116 for use by the component thereafter. In some embodiments, for example, a RoT 115 may have one or more cryptographic keys (e.g., stored in a secure memory thereof, for instance, within a key store therein), which the RoT 115 may use to verify the digital signature to establish its trustworthiness, or lack thereof.

In some embodiments, a RoT 115 may be able to generate an attestation report (e.g., using processing logic thereof), which may provide an attestation as to an identity and/or state of the RoT 115 and/or a component it secures. In some embodiments, for example, a RoT 115 may generate an attestation report as part of an end-to-end challenge response performed between token provisioning system 140 and the RoT 115, based on which token provisioning system 140 may issue an entitlement token to the RoT 115 (as discussed further herein). In some embodiments, for example, token provisioning system 140 may solicit an attestation report from a RoT 115, for example, by issuing an attestation report solicitation request (or solicitation request) to BMC 113, which in turn may issue an attestation report request (or attestation request) to RoT 115. In some embodiments, for example, an application engineer or other representative of the component manufacturer 102 (e.g., to whom an end-customer may have reported an issue or requested special software and/or enablement of special features) may cause the token provisioning system 140 to issue an attestation report solicitation request to a BMC of the computing system. In some embodiments, the token provisioning system 140 may include an authentication challenge (e.g., a nonce generated by the token provisioning system 140) as part of the attestation report solicitation request to be included in any attestation report provided by RoT 115 in response thereto, which BMC 113 may include in the attestation request sent to RoT 115.

In some embodiments, in response to receiving an attestation request, a RoT 115 may generate an attestation report that includes one or more measurements, for example, regarding an identity and/or state (e.g., a current hardware and/or software state) of the RoT 115 or a component it secures. In some embodiments, for example, the attestation report may include measurements regarding immutable software code, mutable software code, boot stages, configuration data, and/or other state variables of the RoT 115 or the component it secures. In some embodiments, for instance, the attestation report generated by a RoT 115 may include a serial number of the RoT 115 and/or the component it secures, current firmware version(s) on the RoT 115 and/or the component it secures, and/or other identity and/or state measurements.

In some embodiments, the attestation report generated by a RoT 115 may include one or more additional parameters. In some embodiments, for instance, the RoT 115 may include an authentication challenge of the token provisioning system 140 (e.g., a nonce generated by the token provisioning system 140), which for example, may have been included as part of the attestation request that was received (e.g., from BMC 113). In this way, the attestation report may serve as an authentication response provided by the RoT 115 to the token provisioning system 140 (e.g., as part of the end-to-end challenge—response performed therebetween).

In some embodiments, the attestation report generated by a RoT 115 may include (another) authentication challenge (e.g., a nonce generated by the RoT 115) to be included in any entitlement token issued by the token provisioning system 140 in response thereto (e.g., as part of an end-to-end challenge—response performed therebetween). In this way, an entitlement token may be tied to a particular attestation report, allowing the RoT 115 to ensure that an entitlement token is "fresh" and prevent a so-called "replay" attack. In some embodiments, for example, a RoT 115 may maintain a current authentication challenge (e.g., in a memory thereof), to be included in an attestation report that is generated and verify a received entitlement token (e.g., to ensure that they match). In some embodiments, a RoT 115 may update the authentication challenge (e.g., generate a new nonce) under certain conditions (e.g., on each power cycle or boot, after an entitlement token is successfully installed, and/or after a particular amount of time has passed). In this way, the authentication challenge may also serve to limit a lifetime of the entitlement token by automatically invalidating the entitlement token once certain conditions have occurred.

In some embodiments, the attestation report generated by a RoT 115 may be signed with a cryptographic key that is unique to the RoT (e.g., a physical unclonable function (PUF)-based key). In doing so, the attestation report (and the identity and/or state measurements contained therein) may be cryptographically bound to a particular RoT 115 and/or component it secures. The attestation report may also serve as proof of possession of the RoT 115 and/or the component it secures. In this way, the token provisioning system 140 upon verification of an attestation report, may be able to safely issue entitlement tokens to a particular RoT 115 and/or exercise control over its use (e.g., by tying an entitlement token to the identity and/or state measurements in the attestation report (or a subset thereof)). In some embodiments, for example, the RoT 115 may compute a message digest from the attestation report using a hashing algorithm (e.g., using an MD5, SHA1, SHA256, or other hashing algorithm), which the RoT 115 may encrypt using the device-unique key. In some embodiments, the RoT 115 may append the encrypted message digest to (or otherwise include it with) the attestation report to sign the attestation report. In some embodiments, the RoT 115 may provide the signed attestation report back to BMC 113 (e.g., in response to the initial attestation request), which in turn, may provide the signed attestation report to token provisioning system 140 (e.g., in response to the initial solicitation request received by the BMC 113). In some embodiments, the BMC 113 and a RoT 115 may establish a secure communication session before the BMC 113 issues the attestation request to the RoT 115 and the RoT 115 provides the attestation report in response thereto.

In some embodiments, the device-unique key of a RoT 115 may be an asymmetric key comprising a private key and public key. In some embodiments, the RoT 115 may use the device-unique private key to sign the attestation report. The token provisioning system 140 may be able to verify the signed attestation report using a corresponding device-unique public key, which may be known to the token provisioning system 140 or provided to the token provisioning system 140. In some embodiments, for example, the token provisioning system 140 may maintain a mapping between a serial number of the RoT 115 and a corresponding device-unique key (e.g., established when the RoT 115 and/or component it secures is first manufactured or placed into production). In other embodiments, the device-unique public key may be provided to the token provisioning system 140 in a certificate (or certificate chain) issued to the RoT 115 by a certificate authority (CA) trusted by the token provisioning system 140 (e.g., for which the token provisioning system 140 has a corresponding root certificate). In some embodiments, for example, the certificate (or certificate chain) may have been issued to the RoT 115 when the RoT 115 and/or component it secures is first manufactured or placed into production and may be stored by the RoT 115 (e.g., in a secure memory thereof, for instance, within a key store therein). In some embodiments, the RoT 115 may provide the certificate (or certificate chain) with the device-unique key to BMC 113, for example, when establishing a secure communication session with the BMC 113 (e.g., in which the attestation request may be issued by the BMC 113 and/or the signed attestation report may be returned by the RoT 115). In some embodiments, the BMC 113 may, in turn, provide the certificate (or certificate chain) to token provisioning system 140 (e.g., along with the attestation report).

In some embodiments, a RoT 115 may be able to process entitlement tokens issued to the RoT 115 by token provisioning system 140 (e.g., using processing logic thereof). In some embodiments, for example, token provisioning system 140 may issue entitlement tokens to a RoT 115, which may authorize and/or enable the RoT 115 to take certain action(s) with respect to a component it secures (including the RoT 115 itself). In some embodiments, token provisioning system 140 may issue different types of entitlement tokens, which may authorize and/or enable a RoT 115 to take different action(s). By way of example, in some embodiments, an entitlement token may authorize and/or enable a RoT 115 to affect a change in the software on a component it secures (including the RoT 115 itself). For convenience, such entitlement tokens may be referred to as software authorization tokens. In some embodiments, for example, a software authorization token may authorize and/or enable a RoT 115 to install certain software (e.g., a custom firmware image, a software tool, or other software object) onto the component it secures (e.g., onto memory 116 thereof) and/or allow the component to load and execute the software once installed (e.g., to boot from the custom firmware image).

In some embodiments, for example, the software authorization token may include a cryptographic key not previously known to the RoT 115, which can be used by the RoT 115 to verify whether particular software can be trusted (e.g., so that it may be safely installed and/or loaded and executed by a component). This may allow a component manufacturer to sign a software object with a non-production key (e.g., a non-production private key), which a RoT 115 may be able to verify using the cryptographic key (e.g., a corresponding non-production public key) provided through a software authorization token. This also allows the software object to be distributed separately from the software authorization token (e.g., using existing software distribution systems). In other embodiments, a software object (e.g., microcode, machine code, etc.) may be embedded or otherwise included within the software authorization token itself. In such cases, the RoT 115 may verify the software authorization token to determine whether the included software object can be trusted, based on which the RoT 115 may install the software object (e.g., on the RoT 115 itself or a component it secures).

In some embodiments, an entitlement token may be used to prevent the RoT 115 from installing certain software onto the component and/or allowing the component to load and execute installed software. For convenience, such entitlement tokens may be referred to as software revocation tokens. In some embodiments, for example, a software revocation token may identify a cryptographic key known to the RoT 115 that is to be revoked (e.g., which may no longer be trusted), such that the software signed using the cryptographic key will no longer be verified by the RoT 115 for installation and/or use.

As another example, in some embodiments, an entitlement token may authorize and/or enable a RoT 115 to configure the software and/or hardware features of the component it secures. For convenience, such entitlement tokens may be referred to as feature configuration tokens. In some embodiments, for example, a feature configuration token may authorize a RoT 115 to unlock or enable one or more features on the component it secures. In some embodiments, for example, a feature configuration token may identify one or more features of a software object that may be present on the component (e.g., features within a firmware image installed on the component and stored in memory 116), which the RoT 115 may make available for use thereafter (e.g., after the entitlement token has been installed).

In some embodiments, a RoT 115 may perform a number of processing operations with respect to an entitlement token, including for example, receiving, verifying, installing, and/or un-installing (or removing) an entitlement token (e.g., using processing logic thereof). In some embodiments, for example, a RoT 115 may receive an entitlement token issued by token provisioning system 140. In some embodiments, the entitlement token may have been issued by token provisioning system 140 in response to an attestation report generated by the RoT 115. In some embodiments, the entitlement token may have been provided to the BMC 113, which may determine a RoT 115 for which it is intended and forward the entitlement token to the appropriate RoT 115 for installation. In some embodiments, for example, the BMC 113 may provide the entitlement token to the appropriate RoT 115 as part of an entitlement token installation request or command (a token installation request) issued by the BMC 113.

In some embodiments, a RoT 115 may attempt to verify an entitlement token that is received (e.g., as part of a token installation command issued by BMC 113) to determine whether it should be processed further (e.g., installed by the RoT 115). In some embodiments, for example, a RoT 115 may verify that the entitlement token can be trusted, is intended for the RoT 115, is valid, and/or is otherwise appropriate for use by the RoT 115. In some embodiments, for example, an entitlement token may have been cryptographically signed by the token provisioning system 140 when it was issued, for example, using a cryptographic key known to, or verifiable by, the RoT 115. In some embodiments, for example, the entitlement token may have been signed using a cryptographic key of a component manufacturer (e.g., a private production key of the component manufacturer), for which a corresponding key (e.g., a public production key of the manufacturer) may have been provided to and stored on the RoT 115 (e.g., when the RoT 115 and/or component it secures was first manufactured or placed into production). In some embodiments, the RoT 115 may attempt to verify the digital signature of the entitlement token to establish its trustworthiness, or lack thereof, for example, using one or more cryptographic key(s) stored on the RoT 115 (e.g., in a secure memory thereof, for instance, within a key store therein), which may include the corresponding production key (e.g., the corresponding public production key). In some embodiments, for example, the RoT 115 may compute a message digest from the entitlement token (e.g., over the entitlement token data excluding the signature) using a hashing algorithm (e.g., using an MD5, SHA1, SHA256, or other hashing algorithm). The RoT 115 may decrypt the digital signature using the cryptographic key(s) stored on the RoT 115, the results of which may be compared to the computed message digest to determine if they match. If the signature is successfully verified (e.g., if a result does match), the RoT 115 may process the entitlement token further (e.g., performing one more additional verification steps and/or installing the entitlement token). If the signature cannot be verified, the RoT 115 may discard the entitlement token. In some embodiments, the RoT 115 may notify the BMC 113 of such a failure, for example, in a response sent thereto.

In some embodiments, the RoT 115 may verify one or more additional parameters included in the entitlement token. In some embodiments, for example, an entitlement token may include one or more identity and/or state parameters (e.g., from the attestation report based upon which it was issued), which may serve to identify a RoT 115 and/or component for which the entitlement token is intended and/or suitable for use. The RoT 115 may compare the parameter values provided in the entitlement token to its identity and/or current state to determine if they match. If the identity and/or state parameters are successfully verified (e.g., if they match the identity and/or current state of the RoT 115), the RoT 115 may process the entitlement token further (e.g., performing one more additional verification steps and/or installing the entitlement token). If the identity and/or state parameters are not successfully verified, the RoT 115 may discard the entitlement token. In some embodiments, the RoT 115 may notify the BMC 113 of such a failure, for example, in a response sent thereto.

In some embodiments, an entitlement token may include an authentication response (e.g., an authentication challenge from the attestation report based upon which it was issued), which the RoT 115 may compare to a current authentication challenge of the RoT 115 to determine if they match. If the authentication response is successfully verified (e.g., if it matches a current authentication challenge of the RoT 115), the RoT 115 may process the entitlement token further (e.g., performing one more additional verification steps and/or installing the entitlement token). If the authentication response is not successfully verified, the RoT 115 may discard the entitlement token. In some embodiments, the RoT 115 may notify the BMC 113 of such a failure, for example, in a response sent thereto. In some embodiments, if the RoT 115 is able to successfully verify the entitlement token it may proceed with processing the entitlement token further (e.g., with installing the entitlement token). In some embodiments, the RoT 115 may notify the BMC 113 that the entitlement token was successfully verified, for example, in a response sent thereto.

In some embodiments, a RoT 115 may attempt to install an entitlement token once it has been verified. In some embodiments, a RoT 115 may only allow a single entitlement token to be installed at a time. In some embodiments, for example, a RoT 115 may check if an entitlement token is already installed, before attempting to install (another) entitlement token. In some embodiments, if an existing entitlement token is not detected, the RoT 115 may proceed with attempting to install the entitlement token.

In some embodiments, the process for installing an entitlement token may depend on a type of the entitlement token. In some embodiments, a RoT 115 may determine a type of the entitlement token (e.g., based on a flag or field within a header thereof) and process the entitlement token accordingly. In some embodiments, for example, where the entitlement token is a software authorization token that includes a cryptographic key, the RoT 115 may parse the software authorization token and extract and store the cryptographic key included therein (e.g., in a secure memory of the RoT 115, for example, within a key store therein). The RoT 115 may be able to use the cryptographic key thereafter, for example, to verify a software object for installation and/or to allow the component to load and/or execute the software object (e.g., to boot from a debug firmware or load and execute a debug tool). In some embodiments, the RoT 115 may store the software authorization token (e.g., in a non-volatile memory thereof) and may parse and extract the cryptographic key from the software authorization token upon different events or under different conditions, for example, each time the RoT 115 attempts to verify a software object for installation and/or allow the component to load and/or execute a software object. In some embodiments, where the entitlement token is a software authorization token that includes an embedded software object, the RoT 115 may parse the software authorization token and extract and store the software object contained therein (e.g., in a secure memory of the RoT 115). The RoT 115 may then proceed with installation of the software object (e.g., on the RoT 115 itself or a component it secures), for example, by storing the software object in memory 116 (e.g., in a particular element thereof, such as memory **116*a*** or memory

116*b*) for use by the component thereafter (e.g., by the RoT 115 or a component it secures).

In some embodiments, where the entitlement token is a software revocation token, the RoT 115 may parse the software revocation token and extract a cryptographic key included therein. The RoT 115 may compare the extracted cryptographic key to known cryptographic keys stored on the RoT 115 (e.g., in a secure memory of the RoT 115, for example, within a key store therein), and if a match is found may remove or otherwise disable use of the cryptographic key. In some embodiments, where the entitlement token is a feature configuration token, the RoT 115 may parse the feature configuration token and determine what features are identified therein and may configure (e.g., enable or disable) use of the identified features thereafter (e.g., by setting or adjusting one or more software flags, register values, or the like). In some embodiments, the RoT 115 may store the feature configuration token (e.g., in a secure memory thereof) and may parse the feature configuration token to determine what features are to be configured upon different events or under different conditions, for example, on each boot or power cycle of the RoT 115 and/or component it secures. In some embodiments, the RoT 115 may provide the BMC 113 with a response indicating whether installation of the entitlement token was successful or if some error occurred during installation.

In some embodiments, a RoT 115 may un-install (or remove) an entitlement token. In some embodiments, for example, once an entitlement token is no longer needed (e.g., once testing and validation by an end-customer is complete), the BMC 113 may issue an entitlement token uninstall request or command (or token removal request), instructing the RoT 115 to remove an entitlement token. In some embodiments, the token removal request may identify an entitlement token to be removed, while in other embodiments, the token removal request may be understood as calling for the removal of any installed entitlement tokens (e.g., any entitlement tokens in a memory of the RoT 115). In some embodiments, the RoT 115 may notify the BMC 113 as to the success or failure of the token removal, for example, in a response sent thereto.

In some embodiments, removal of an entitlement token may involve reversing one or more other steps taken during installation of the entitlement token. In some embodiments, for example, uninstalling an entitlement token may involve removing or revoking a cryptographic key that may have been stored, removing a software object that may have been stored in memory, disabling one or more features that had been enabled, and/or deleting the entitlement token from the RoT 115 (e.g., from a non-volatile memory thereof). In some embodiments, a RoT 115 may attempt to re-verify an entitlement token upon different events or under different conditions and may remove an entitlement token if such re-verification is unsuccessful. In some embodiments, for example, a RoT 115 may re-verify an entitlement token on each boot or power cycle of the RoT 115 and/or the component it secures, after installation of a software object (e.g., a new firmware image) on the RoT 115 and/or component it secures, after a particular amount of time has passed, and/or upon some other event or under some other conditions.

In some embodiments, a RoT 115 may be able to install a software object (e.g., a firmware image or other software object) onto the RoT 115 and/or a component it secures. In some embodiments, for example, the BMC 113 may receive a software update package (e.g., from a software distribution system 150) containing one or more software objects for installation on corresponding RoTs 115 or components they secure. The BMC 113 may parse the software update package to identify the software objects intended for one or more components managed by the BMC 113. In some embodiments, the BMC 113 may extract the identified software objects and provide them to appropriate RoTs 115 for installation on the RoTs 115 or components they secure. In some embodiments, for example, the BMC 113 may issue a software installation or update command (a software installation command) to a RoT 115, directing the RoT 115 to install a software object (e.g., on the RoT 115 itself or a component it secures). In some embodiments, the BMC 113 may provide the software object as part of the software installation command.

In some embodiments, in response to receiving a software object for installation (e.g., as part of a software installation command issued by BMC 113), a RoT 115 may attempt to verify a digital signature of the software object to ensure that it can be trusted using one or more cryptographic keys stored therein. In some cases, for example, the software object (e.g., a "secure" firmware update) may be signed with a production key, which may have been provided to the RoT 115 when it or a component it secures was first manufactured or placed into production. In other cases, the software object (e.g., a custom debug firmware, helpful debug tool, etc.) may be signed with a non-production key (e.g., a debug key), which for example, may have been provided to the RoT 115 in a software authorization token installed thereon. In some embodiments, if the software object is successfully verified, the RoT 115 may proceed with installation, for example, by storing the software object in memory 116 (e.g., in a particular element thereof, such as memory 116*a* or memory 116*b*) for use by the component thereafter (e.g., by the RoT 115 or a component it secures). In some embodiments, a RoT 115 may notify the BMC 113 as to the success or failure of the verification and/or installation, for example, in a response message sent to the BMC 113. In some embodiments, where the BMC 113 and RoT 115 communicate using the MCTP protocol and/or according to the PLDM protocol, the software object installation process (e.g., including issuance of the software installation command, providing of the software object, notification of installation success or failure) may be affected through the exchange of a sequence of one or more MCTP and/or PLDM messages (and/or data structures).

In some embodiments, the BMC 113 may disable background copy on a RoT 115 before attempting to install a software object or a particular type thereof (e.g., before installing a firmware image), for example, by issuing a background copy disable request. In some embodiments, disabling background copy on a RoT 115 may prevent the RoT 115 from installing a software object onto a particular element of memory 116, for example, to memory 116*b*. In some embodiments, for example, memory 116*b* may be used to store a secondary firmware image or fallback firmware image (e.g., a production signed firmware), and if for some reason, installation of a firmware image (e.g., a debug firmware) to memory 116*a* fails, it may still be possible to fall back to (e.g., to boot from) the firmware image in memory 116*b*. In some embodiments, for example, where the BMC 113 and RoT 115 communicate using the MCTP protocol, background copy may be disabled by sending a corresponding MCTP message, for example, a vendor defined message (VDM). In some embodiments, in response to receiving a background copy disable request from BMC 113, a RoT 115 may provide a response indicating whether background copy was (or was not) successfully disabled. In some embodiments, for example, where the BMC 113 and RoT 115 communicate using the MCTP protocol, the RoT 115 may send a corresponding MCTP message, for example, a VDM, in response. In some embodiments, if background copy is not successfully disabled, the BMC 113 may not issue a software installation command to the RoT 115.

In some embodiments, a computing system 110 may include a management controller, such as BMC 113, that may be used to perform different management functions with respect to computing system 110 and its components (e.g., with respect to itself, processing logic 112, peripheral components 114, and/or RoTs 115). In some embodiments, the BMC 113 may itself comprise a number of components. In some embodiments, for example, the BMC 113 may comprise BMC-level processing logic (e.g., an embedded CPU, FPGA, ASIC, or other form of processing logic), one or more memories (or other storage elements), including for example, memory 116, one or more communication interfaces (e.g., a PCIe interface, $I^2C$ or SMBus interface, SPI interface, Universal Serial Bus (USB) interface, network communication interface, and/or other communication interface), and/or one or more other components. The BMC 113 may be coupled to and able to communicate with other components of the computing system 110 (e.g., processing logic 112, peripheral components 114, and/or RoTs 115), for example, over communication bus 111*a* (e.g., using respective communication interfaces thereof). In some embodiments, the BMC 113 and the components it may manage may communicate with each other according to a communication protocol, or a set of communication protocols (e.g., a protocol stack), which may govern the manner in which such communication is to take place.

For instance, in some embodiments, BMC 113 may be coupled to and able to communicate with RoTs 115 over an $I^2C$ bus or SMBus or an SPI bus (or other communication bus) using respective communication interfaces thereof (e.g., an $I^2C$ or SMBus interface or SPI interface thereof). The BMC 113 and RoTs 115 may communicate with each other, at least in part, according to the $I^2C$ or SMBus protocol or SPI protocol (or some other communication protocol). In some embodiments, BMC 113 and RoTs 115 may communicate with each other using one or more higher layer protocols, which for example, may be implemented atop the $I^2C$ or SMBus protocol, SPI protocol, or other lower layer protocols (e.g., atop other physical layer and/or data-link layer protocols). In some embodiments, for example, BMC 113 and RoTs 115 may communicate with each other, at least in part, according to one or more standards developed and maintained by the Distributed Management Task Force (DMTF).

In some embodiments, for example, a RoT 115 and BMC 113 may communicate with each other according to the Management Component Transport Protocol (MCTP). The MCTP protocol may be used to facilitate communication between management controllers, such as BMC 113, and the different components it may be responsible for managing, such as RoTs 115, for example, to support different monitoring and control functions. The MCTP protocol is an extensible protocol, which for example, supports the use of vendor defined messages. The MCTP protocol is a transport protocol (or transport layer protocol) that may be used to facilitate communication over different underlying communication buses. The MCTP protocol may be implemented on top of one or more other protocols, for example, different physical and data-link layer protocols (e.g., $I^2C$ or SMBus protocols, PCIe protocol, etc.) and may support one or more higher layer protocols.

In some embodiments, for example, BMC 113 and RoTs 115 may communicate with each other according to the Platform Level Data Model (PLDM) standard (e.g., including the base specification and/or extensions thereof) and/or the Security Protocols and Data Models (SPDM) standard, which may be implemented atop the MCTP protocol. The PLDM standard, for example, may define messages, data structures (or data objects), and/or message exchange sequences for performing different management-related functions (e.g., for transferring software objects from BMC 113 to RoTs 115 and/or updating the software on RoTs 115 and/or a component it secures). The SPDM standard may define messages, data structures (or data objects), and/or message exchange sequences for performing different security-related functions (e.g., for establishing secure communication sessions between the BMC 113 and RoTs 115, authenticating a hardware identity of RoTs 115 and/or the components they secure, and/or measurement of a software identity of RoTs 115 and/or the components they secure).

In some embodiments, the BMC 113 may itself be externally managed or controlled. In some embodiments, for example, the BMC 113 may provide an outward facing interface (e.g., a web service-based interface) through which the computing system 110 and its components may be managed. In some embodiments, for example, the BMC 113 may provide an application programming interface (API), which may expose one or more services, through which management operations may be conducted (e.g., through the exchange of messages therewith). In some embodiments, for instance, the BMC 113 may provide a Redfish API (e.g., implemented according to the Redfish standard, including the base specification and/or extensions thereof) that exposes one or more resources (e.g., one or more services) through which management operations may be conducted (e.g., through the exchange of messages in accordance with the Redfish protocol, for example, using the hypertext transfer protocol (HTTP), transmission control protocol (TCP), and/or Internet protocol (IP)).

In some embodiments, the BMC 113 may be able to solicit attestation reports from the RoTs 115 it manages (e.g., using processing logic thereof). In some embodiments, for example, token provisioning system 140 may issue entitlement tokens based on an end-to-end challenge response performed between the token provisioning system 140 and one or more RoTs 115 of computing system 110. As part of the entitlement token issuance process, the token provisioning system 140 may solicit an attestation report from each of the RoTs 115 (e.g., providing an attestation as to an identity and/or state of the RoT 115 and/or a component it secures, based on which the token provisioning system 140 may issue an entitlement token).

In some embodiments, the BMC 113 may provide an attestation report solicitation service to help facilitate soliciting attestation reports from the RoTs 115 it manages. In some embodiments, for example, the token provisioning system 140 may be able to issue an attestation report solicitation request to the BMC 113 through the attestation report solicitation service. In some embodiments, for instance, where the BMC 113 provides an outward facing interface (e.g., a Redfish API or Redfish service) the token provisioning system 140 may invoke the attestation report solicitation service by sending a message to the interface (e.g., by sending an HTTP request message, such as an HTTP GET message, to access the attestation report solicitation service). In some embodiments, the token provisioning system 140 may include an authentication challenge (e.g., a nonce generated by the token provisioning system 140) as part of the attestation report solicitation request to be included in any attestation reports provided in response thereto. In some embodiments, the BMC 113, in response to receiving an attestation report solicitation request from the token provisioning system 140, may notify the token provisioning system 140 that the attestation report solicitation request was received and/or that an attestation report solicitation process (or task) had been started. In some embodiments, for example, where the attestation report solicitation request was received through an attestation report solicitation service, the service may provide the notification to the token provisioning system 140 in a response message (e.g., in an HTTP response message).

In some embodiments, the BMC 113, in response to receiving an attestation report solicitation request from the token provisioning system 140, may request an attestation report from each RoT 115 that it manages (or a subset thereof). In some embodiments, for example, the BMC 113 may issue an attestation report request (or attestation request) to each RoT 115, requesting an attestation as to an identity and/or state of the RoT 115 and/or a component it secures, which may be provided as an attestation report. In some embodiments, the BMC 113 may include the authentication challenge from the attestation report solicitation request received by the BMC 113 (e.g., from the token provisioning system 140) as part of the attestation request issued to a RoT 115 for the RoT 115 to include as part of the attestation report that it returns. In some embodiments, in response to receiving an attestation request from BMC 113, a RoT 115 may generate a signed attestation report (as discussed herein), which the RoT 115 may provided back to the BMC 113 (e.g., in response to the attestation request that was issued). In some embodiments, the BMC 113 and a RoT 115 may establish a secure communication session before exchanging the attestation request and attestation report therebetween.

As an illustrative example, in some embodiments, where the BMC 113 and RoT 115 may communicate with each other using the SPDM protocol (e.g., on top of the MCTP protocol and SPI protocol), the attestation report request process may be affected through the exchange of a sequence of one or more MCTP and/or SPDM messages (and/or data structures). In some embodiments, for example, the BMC 113 and RoT 115 may exchange a sequence of one or more messages to negotiate and establish a secure communication session. In some embodiments, for instance, the BMC 113 may send a GET_VERSION message and the RoT 115 may respond with a VERSION message, to discover what SPDM version(s) may be commonly supported. The BMC 113 may then send a GET_CAPABILITIES message and the RoT 115 may respond with a CAPABILITIES message, to determine what capabilities the RoT 115 supports (e.g., whether it supports measurement and/or authentication, its timeout rate, etc.). The BMC 113 may then send a NEGOTIATE_ALGORITHMS message, advertising the cryptographic algorithms supported by the BMC 113, and the RoT 115 may respond with an ALGORITHMS message, selecting the cryptographic algorithms that are to be used for the communication session.

In some embodiments, the BMC 113 may also authenticate the RoT 115. In some embodiments, for instance, the BMC 113 may send a GET_DIGESTS message and the RoT 115 may respond with a DIGEST message, containing digests for the different signing certificate(s) (or certificate chain(s)) available on the RoT 115. The BMC 113 may then request, and the RoT 115 may respond with, a particular certificate (or certificate chain), through the exchange of GET_CERTIFICATE request messages and CERTIFICATE response messages (the number of which may depend on the size of the certificate or certificate chain). In some embodiments, the certificate (or certificate chain) that is provided by the RoT 115 may contain a device-unique cryptographic key (e.g., a device-unique public key of the RoT 115), which the BMC 113 may use to verify a signature on messages received from the RoT 115 thereafter. In some embodiments, for example, the certificate may have been issued to the RoT 115 by a certificate authority trusted by the BMC 113, such that it may be able to verify the certificate and its contents (e.g., using a public key of the certificate authority known to the BMC 113). In some embodiments, for instance, the BMC 113 may have been provided with the certificate (or a root certificate of a certificate chain), such that it may be able to verify the certificate and its contents. The BMC 113 may then send a CHALLENGE message (e.g., containing a nonce generated by the BMC 113) and the RoT 115 may respond with a CHALLENGE_AUTH message signed by the RoT 115 using a cryptographic key corresponding to a particular certificate (e.g., a corresponding device-unique private key of the RoT 115), which the BMC 113 may verify to authenticate the RoT 115.

In some embodiments, once secure communication has been established, the BMC 113 may issue the attestation report request. In some embodiments, for example, the BMC 113 may send a GET_MEASUREMENTS message to the RoT 115, requesting the attestation report, and the RoT 115 may respond with a MEASUREMENT message, containing the attestation report. In some embodiments, the GET_MEASUREMENTS message may include a measurement operation parameter requesting a measurement at a particular index value (e.g., 0x32 or 50), which the RoT 115 may understand as requesting an attestation report. In some embodiments, the GET_MEASUREMENT message may include the authentication challenge from the attestation report solicitation request received by the BMC 113, which may be included within the attestation report and/or the MEASUREMENT message provided in response. In some embodiments, the MEASUREMENT message (or attestation report response message) may be signed by the RoT 115 (e.g., using a device-unique cryptographic key), for example, with the signature being appended thereto. In some embodiments, the signature may be over both the attestation request (e.g., the GET_MEASUREMENT request message) and the attestation report provided in response (e.g., the MEASUREMENT message) being sent in response (collectively, the MEASUREMENT "transcript").

In some embodiments, the BMC 113 may determine whether a RoT 115 has an entitlement token already installed thereon before issuing an attestation request to the RoT 115, which for example, may serve to prevent the issuance and installation of new entitlement tokens to the RoT 115. In some embodiments, for example, the BMC 113 may request an entitlement token status from each RoT 115 that it manages. In some embodiments, for example, the BMC 113 may issue an entitlement token status request to each RoT 115, asking the RoT 115 to provide a serial number of the RoT 115 and/or component it secures, indicate whether the RoT 115 has any entitlement tokens installed, and/or indicate a fuse state of the RoT 115 (e.g., whether it is production fused, development or debug fused, etc.). In some embodiments, for example, where the BMC 113 and RoT 115 communicate using the MCTP protocol, the entitlement token status request may be issued by sending a corresponding MCTP message, for example, a vendor defined message (VDM). In some embodiments, in response to receiving an entitlement token status request from BMC 113, a RoT 115 may provide an entitlement token status response with the requested information. In some embodiments, for example, where the BMC 113 and RoT 115 communicate using the MCTP protocol, the RoT 115 may send a MCTP message, for example, a VDM, in response, which for example, may include a serial number of the RoT 115 and/or component it secures, indicate whether the RoT 115 has any entitlement tokens installed, and/or indicate a fuse state of the RoT 115 (e.g., whether it is production fused, development or debug fused, etc.).

In some embodiments, the BMC 113 may provide signed attestation report received back from RoTs 115 to the token provisioning system 140 (e.g., in response to the attestation report solicitation request). In some embodiments, the BMC 113 may append a signing certificate (or certificate chain) to (or otherwise coupled it to) each attestation report containing the device-unique key of the RoT 115 that signed the attestation report, before returning the attestation report to the token provisioning system 140. In some embodiments, for example, the certificate may have been provided to the BMC 113 by the RoT 115 (e.g., as part of establishing communication therebetween). In some embodiments, where the RoT 115 provides the attestation report in a signed response message that was signed over both the attestation request message and the attestation response message (or attestation report transcript), the BMC 113 may provide the entire transcript back to the token provisioning system 140. In such embodiments, the signing certificate (or certificate chain) containing the device-unique key of the RoT 115 (e.g., that signed the attestation report and/or the attestation report response message) may be appended to the attestation report response message or transcript (instead of the attestation report itself, contained therein), before the transcript is provided to the token provisioning system 140. In some embodiments, the BMC 113 may aggregate the signed attestation reports (or attestation report transcripts) received back from each RoT 115 that it manages (which in some embodiments, may include a corresponding signing certificate of the respective RoT 115) to generate an attestation report collection. In some embodiments, the BMC 113 may provide the attestation report collection back to the token provisioning system 140 (e.g., in response to the attestation report solicitation request that was initially received). In some embodiments, the BMC 113 may record (or cache) the identity of the RoTs 115 from which an attestation report was received, which the BMC 113 may later use to facilitate the distribution and installation of entitlement tokens that are received in response (e.g., from token provisioning system 140) on an appropriate RoT 115 (e.g., for which the entitlement token is intended). In some embodiments, for example, the BMC 113 may maintain a mapping of a globally unique device identifier of a RoT 115 (e.g., a Universally Unique Identifier (UUID) of the RoT 115), obtained from the RoT 115 (e.g., through the exchange of MCTP control messages therewith), and a serial number of the RoT 115 and/or a component it secures, obtained from the attestation report provided by the RoT 115. In some embodiments, an entitlement token that is issued in response to the attestation report may specify a serial number of the RoT 115 and/or component for which it is intended, based on which the BMC 113 may be able to determine a corresponding device identifier (e.g., from the mapping that was recorded) to which the entitlement token should be provided for installation.

In some embodiments, the token provisioning system 140 may process each attestation report returned by the BMC 113 (e.g., each attestation report in the attestation report collection) and (e.g., upon verification of the attestation report and/or satisfaction of one or more policy criteria) generate an entitlement token for the RoT 115 that generated a respective attestation report. In some embodiments, token provisioning system 140 may sign an entitlement token, for example, using a cryptographic key that is already known to, or verifiable by, a RoT 115 (e.g., using a production key). In some embodiments, an entitlement token that is generated may be provided back to the BMC 113 for installation on a corresponding RoT 115 (e.g., to which the entitlement token was issued) managed thereby. In some embodiments, the token provisioning system 140 may aggregate multiple entitlement tokens (e.g., once all attestation reports in an attestation report collection have been processed and appropriate entitlement tokens have been generated and signed) to generate an entitlement token collection, which may be provided back to the BMC 113 for disaggregation and installation on respective RoTs 115 managed thereby. In some embodiments, the token provisioning system 140 may provide an entitlement token (or entitlement token collection) to the BMC 113 for installation on a respective RoT 115 (or respective RoTs 115) managed by the BMC 113.

In some embodiments, for example, the BMC 113 may provide an entitlement token installation service (or token installation service) to help manage the distribution and installation of entitlement tokens to RoTs 115. In some embodiments, for example, the token provisioning system 140 may be able to issue an entitlement token installation request (or token installation request) to the BMC 113 through the entitlement token installation service. In some embodiments, an entitlement token (or entitlement token collection) may be provided as part of the token installation request. In some embodiments, for instance, where the BMC 113 provides an outward facing interface (e.g., a Redfish API or Redfish service) the token provisioning system 140 may invoke the entitlement token installation service by sending a message to the interface (e.g., by sending an HTTP request message, such as an HTTP GET message, to access the entitlement token installation service). In some embodiments, the token provisioning system 140 may include an entitlement token (or entitlement token collection) as part of the message.

In some embodiments, the BMC 113 may process a received entitlement token to determine a RoT 115 for which it is intended and provide it to the identified RoT 115 for installation. In some embodiments, for example, the BMC 113 may have recorded (or cached) the identity of the RoTs 115 from which attestation reports were received. In some embodiments, for example, the BMC 113 may maintain a mapping of a globally unique device identifier of a RoT 115 (e.g., a UUID) and a serial number of the RoT 115 and/or a component it secures. In some embodiments, the BMC 113 may parse an entitlement token that is received and extract a serial number specified therein (e.g., of the RoT 115 and/or component it secures). The BMC 113 may match the extracted serial number to a corresponding device identifier (e.g., from the mapping that was recorded) to identify the RoT 115 for which the entitlement token should be provided for installation.

In some embodiments, the BMC 113 may issue an entitlement token installation command to the identified RoT 115 and provide the entitlement token to the RoT 115 for installation thereby (e.g., as part of the entitlement token installation command). In some embodiments, for example, where the BMC 113 and RoT 115 communicate using the MCTP protocol, the entitlement token installation command may be issued by sending a corresponding MCTP message, for example, a vendor defined message (VDM), which may include the entitlement token as part of the message payload. In some embodiments, the RoT 115 may attempt to verify the entitlement token and, if successfully verified attempt to install the entitlement token (e.g., as described herein). In some embodiments, the RoT 115 may notify the BMC 113 as to the success and/or failure of the RoT 115 in verifying and/or installing the entitlement token. In some embodiments, for example, where the BMC 113 and RoT 115 communicate using the MCTP protocol, the RoT 115 may send a MCTP message, for example, a VDM, in response, which may include a status code indicating success or failure (and in some cases, a specific error or reason for failure). In some embodiments, where the BMC 113 receives an entitlement token collection, it may extract and process each entitlement contained therein (e.g., in a similar manner to that just described).

In some embodiments, the BMC 113 may determine whether a RoT 115 has an entitlement token already installed thereon before issuing an entitlement token installation command to the RoT 115, which for example, may serve to prevent the installation of new entitlement tokens to the RoT 115. In some embodiments, for example, the BMC 113 may request an entitlement token status from each RoT 115 that it manages. In some embodiments, for example, the BMC 113 may issue an entitlement token status request to each RoT 115, asking the RoT 115 to provide a serial number of the RoT 115 and/or component it secures, indicate whether the RoT 115 has any entitlement tokens installed, and/or indicate a fuse state of the RoT 115 (e.g., whether it is production fused, development or debug fused, etc.). In some embodiments, for example, where the BMC 113 and RoT 115 communicate using the MCTP protocol, the entitlement token status request may be issued by sending a corresponding MCTP message, for example, a vendor defined message (VDM). In some embodiments, in response to receiving an entitlement token status request from BMC 113, a RoT 115 may provide an entitlement token status response with the requested information. In some embodiments, for example, where the BMC 113 and RoT 115 communicate using the MCTP protocol, the RoT 115 may send a MCTP message, for example, a VDM, in response, which for example, may include a serial number of the RoT 115 and/or component it secures, indicate whether the RoT 115 has any entitlement tokens installed, and/or indicate a fuse state of the RoT 115 (e.g., whether it is production fused, development or debug fused, etc.).

In some embodiments, the BMC 113 may disable background copy on a RoT 115 before attempting to install an entitlement token or a particular type thereof (e.g., before installing a software authorization token). In some embodiments, disabling background copy on a RoT 115 may prevent the RoT 115 from installing a software object onto a memory 116, for example, to memory 116*b*. In some embodiments, for example, memory 116*b* may be used to store a secondary firmware image or fallback firmware image (e.g., a production signed firmware), and if for some reason, installation of a firmware image (e.g., a debug firmware) to memory 116*a* fails, it may still be possible to fall back to (e.g., to boot from) the firmware image in memory 116*b*. In some embodiments, for example, where the BMC 113 and RoT 115 communicate using the MCTP protocol, background copy may be disabled by sending a corresponding MCTP message, for example, a vendor defined message (VDM). In some embodiments, in response to receiving a background copy disable request from BMC 113, a RoT 115 may provide a response indicating whether background copy was (or was not) successfully disabled. In some embodiments, for example, where the BMC 113 and RoT 115 communicate using the MCTP protocol, the RoT 115 may send a corresponding MCTP message, for example, a VDM, in response. In some embodiments, if background copy is not successfully disabled, the BMC 113 may not issue an entitlement token installation command to the RoT 115.

In some embodiments, the BMC 113 may allow for external monitoring of the entitlement tokens installed on the RoTs 115 it manages, for example, as part of an entitlement token status solicitation service. In some embodiments, for example, the token provisioning system 140 may issue an entitlement token status solicitation request to the BMC 113 to solicit an entitlement token status of the BMC 113 and/or the RoTs 115 it manages (e.g., whether any RoTs 115 managed by the BMC 113 have entitlement tokens installed, which RoTs 115 have debug tokens installed, and/or a fuse state of each RoT 115). In some embodiments, for instance, where the BMC 113 provides an outward facing interface (e.g., a Redfish API or Redfish service) the token provisioning system 140 may invoke the entitlement token status solicitation service by sending a message to the interface (e.g., by sending an HTTP request message, such as an HTTP GET message, to access the entitlement token status solicitation service). In some embodiments, the BMC 113, in response to receiving an entitlement token status solicitation request from the token provisioning system 140, may notify the token provisioning system 140 that the entitlement token status solicitation request was received and/or that an entitlement token status solicitation process (or task) had been started. In some embodiments, for example, where the entitlement token status solicitation request was received through an entitlement token status solicitation service, the service may provide the notification to the token provisioning system 140 in a response message (e.g., in an HTTP response message).

In some embodiments, the BMC 113, in response to receiving an entitlement token status solicitation request from the token provisioning system 140, may request an entitlement token status from each RoT 115 that it manages. In some embodiments, for example, the BMC 113 may issue an entitlement token status request to each RoT 115, asking the RoT 115 to provide a serial number of the RoT 115 and/or component it secures, indicate whether the RoT 115 has any entitlement tokens installed, and/or indicate a fuse state of the RoT 115 (e.g., whether it is production fused, development or debug fused, etc.). In some embodiments, for example, where the BMC 113 and RoT 115 communicate using the MCTP protocol, the entitlement token status request may be issued by sending a corresponding MCTP message, for example, a vendor defined message (VDM). In some embodiments, in response to receiving an entitlement token status request from BMC 113, a RoT 115 may provide an entitlement token status response with the requested information. In some embodiments, for example, where the BMC 113 and RoT 115 communicate using the MCTP protocol, the RoT 115 may send a MCTP message, for example, a VDM, in response, which for example, may include a serial number of the RoT 115 and/or component it secures, indicate whether the RoT 115 has any entitlement tokens installed, and/or indicate a fuse state of the RoT 115 (e.g., whether it is production fused, development or debug fused, etc.).

In some embodiments, the BMC 113 may receive an entitlement token (or entitlement token collection) for installation as part of software update package. In some embodiments, for example, the token provisioning system 140 may provide an entitlement token (or entitlement token collection) that it generates to a software distribution system 150, which may include the entitlement token (or entitlement token collection) as part of a software update package. In some embodiments, the software update package may include one or more software objects (e.g., firmware images) for installation on the BMC 113 and/or the components it manages (e.g., on processing logic 112, peripheral components 114, and/or RoTs 115). In some embodiments, a software object included in the software update package may be associated with an entitlement token included in the software update package (e.g., which the entitlement token may authorize a RoT 115 to install). In some embodiments, the software distribution system 150 may distribute a software update package with an entitlement token (or entitlement token collection) to the BMC 113 for installation. In some embodiments, where the entitlement token (or entitlement token collection) is provided within a software update package, the BMC 113 may determine that an entitlement token (or entitlement token collection) is present within the software update and extract it for further processing (e.g., in a similar manner to that previously described). In some embodiments, the BMC may extract and process the entitlement token collection before processing the rest of its contents (e.g., before installing any software objects contained therein).

In some embodiments, the BMC 113 may provide a software update service to help facilitate the distribution and installation of software onto components managed by the BMC 113 (e.g., on processing logic 112, peripheral components 114, and/or RoTs 115). In some embodiments, for example, the software distribution system 150 may be able to provide a software update package to the BMC 113 for installation on components thereof. In some embodiments, for instance, where the BMC 113 provides an outward facing interface (e.g., a Redfish API or Redfish service) the software distribution system 150 may invoke the software update service by sending a message to the interface (e.g., by sending an HTTP request message, such as an HTTP GET message, to access the software update service). In some embodiments, the software distribution system 150 may include a software update package as part of the message.

In some embodiments, the software update service may operate in accordance with the PLDM standard (e.g., including the PLDM for Firmware Update Specification). The PLDM standard amongst other things may define a structure of the software update package and a manner in which it is to be handled by the BMC 113 (by a PLDM handler thereof), for example, to extract and install software objects contained therein. A PLDM software update package (or PLDM package), for example, may include a package header along with one or more software objects (e.g., firmware images). The package header may include a header information portion (e.g., describing the package version, date, etc.), component identifier records (describing the components, including downstream components, the update is intended for), package content information (e.g., describing the software images contained within the package, including for example, their classification, offset, size, and version), and a checksum. In some embodiments, an entitlement token (or entitlement token collection) may be included in a PLDM package as a "dummy" software object intended for a "dummy" component. In some embodiments, for example, a special component identifier (e.g., a specific UUID) and/or software object identifier (e.g., 0xDEAD or 57005) may be used in the PLDM package header to indicate that a software object is an entitlement token (or entitlement token collection).

In some embodiments, upon receipt of a software update package (e.g., via a request issued to the software update service), the BMC 113 may attempt to process the software update package (e.g., using a PLDM handler thereof). In some embodiments, the BMC 113 may examine the software update package to determine if an entitlement token (or entitlement token collection) is included therein. In some embodiments, for example, the BMC 113 may parse a package header to identify a dummy software object within the package that comprises the entitlement token (or entitlement token collection). In some embodiments, for example, the entitlement token (or entitlement token collection) may be identified with a special component identifier (e.g., a specific dummy component UUID) and/or as a special software object identifier (e.g., 0xDEAD or 57005) within the package header. In some embodiments, the BMC 113 may extract the identified software object (e.g., based on associated package information in the header, such as a package offset and object size), comprising the entitlement token (or entitlement token collection), and provide it to an entitlement token installation service for processing (e.g., as previously described). In some embodiments, the BMC 113 may examine the software update package to determine if an entitlement token (or entitlement token collection) is included therein and may extract and process the entitlement token (or entitlement token collection) before processing the rest of the software update package (e.g., before installing any other software objects contained therein).

In some embodiments, after all entitlement tokens (or entitlement token collections) in a software update package have been extracted and processed, the BMC 113 may process the rest of the software objects in the software update package. In some embodiments, for example, the BMC 113 may parse the package header to identify one or more software objects within the software update package that are intended for one or more components managed by the BMC 113. In some embodiments, the BMC 113 may extract the identified software objects and provide them to appropriate RoTs 115 for installation on the RoTs 115 or components they secure. In some embodiments, for example, the BMC 113 may issue a software installation or update command (a software installation command) to a RoT 115, directing the RoT to install a software object (e.g., on the RoT 115 itself or a component it secures). In some embodiments, the BMC 113 may provide the software object as part of the software installation command. In some embodiments, in response to receiving a software object for installation (e.g., as part of a software installation command issued by BMC 113), a RoT 115 may attempt to verify and (if successfully verified) install the software object (e.g., as previously discussed). In some embodiments, a RoT 115 may notify the BMC 113 as to the success or failure of the verification and/or installation, for example, in a response message sent to the BMC 113 (e.g., as previously discussed).

In some embodiments, if the BMC 113 examines the software update package and determines that there are no entitlement tokens (or entitlement token collections) included therein, it may be understood as indicating that entitlement tokens are no longer needed by the RoTs 115 managed by the BMC 113. In some embodiments, the BMC 113 may then issue a token removal request to each RoT 115 managed by the BMC 113, instructing the RoT 115 to remove any entitlement tokens installed thereon. In some embodiments, for example, where the BMC 113 and RoT 115 communicate using the MCTP protocol, the entitlement token status request may be issued by sending a corresponding MCTP message, for example, a vendor defined message (VDM). In some embodiments, the RoT 115 may notify the BMC 113 as to the success or failure of the token removal, for example, in a response sent thereto. In some embodiments, for example, where the BMC 113 and RoT 115 communicate using the MCTP protocol, the RoT 115 may send a MCTP message, for example, a VDM, in response, which for example, may include a status code indicating success or failure (and in some cases, a specific error or reason for failure).

In some embodiments, computing system(s) 110 may be coupled to, and able to communicate with, a token provisioning system 140. In some embodiments, the token provisioning system 140 may include one or more components, including for example, a system-level processing component (e.g., a CPU, FPGA, ASIC, etc.), one or more additional processing components, switches, controllers, communication interfaces, other system components. In some embodiments, the token provisioning system 140 may also be coupled to, and able to communicate with, software distribution system 150 over communication network 170 (e.g., a LAN, a WAN, the public Internet, and/or one or more other communication networks). While illustrated as separate communication networks, in some embodiments, communication network 160 and communication network 170 may overlap with each other (e.g., in whole or in part).

In some embodiments, token provisioning system 140 may be used to issue entitlement tokens to RoTs 115 of the computing system(s) 110 (e.g., using processing logic thereof), which may authorize and/or enable the RoTs 115 to take certain action(s) with respect to the components they secure (e.g., to affect a change in the software and/or features available on the components). In some situations, for example, a component manufacturer may wish to modify the software and/or enable features on one or more components of a computing system 110 (or multiple computing system(s) 110), which for example, may be maintained and/or operated by an end-customer of the component manufacturer. By way of example, a component manufacture may want to provide the end-customer with special software for one or more components of a computing system 110 (e.g., custom debug firmware, helpful debug tools, etc.) and/or to enable certain features on (e.g., verbose logging, ultra-high frequency operation, unlimited hash rate computation, etc.) one or more components of a computing system 110, for example, to allow the end-customer to test, validate, and/or qualify the computing system 110 and/or its components, to assess and/or resolve any problems that may have arisen with respect to the components (e.g., when integrating them into the computing system 110), or to support certain applications or workloads (e.g., HPC applications or workloads). In such situations, the component manufacturer may use the token provisioning system 140 to issue entitlement tokens to the RoTs 115 that secure the components for which the software is intended and/or on which the features are to be enabled.

In some embodiments, for example, the token provisioning system 140 may issue entitlement tokens based on an end-to-end challenge-response performed between the token provisioning system 140 and one or more RoTs 115 of a computing system 110. In some embodiments, for instance, the token provisioning system 140 may solicit an attestation report from each of the RoTs 115, which may provide an attestation as to an identity and/or state of the RoT 115 and/or a component it secures, based on which the token provisioning system 140 may issue an entitlement token. In some embodiments, for example, the token provisioning system 140 may be able to issue an attestation report solicitation request to a BMC 113 of the computing system 110. In some embodiments, for example, an application engineer or other representative of the component manufacturer 102 (e.g., to whom an end-customer may have reported an issue or requested special software and/or enablement of special features) may cause the token provisioning system 140 to issue an attestation report solicitation request to a BMC of the computing system. In some embodiments, for example, the token provisioning system 140 may issue the attestation report solicitation request through an attestation report solicitation service provided by the BMC 113.

In some embodiments, for instance, the BMC 113 may provide an outward facing interface (e.g., a Redfish API or Redfish service) through which the token provisioning system 140 may invoke the attestation report solicitation service, for example, by sending a message to the interface (e.g., by sending an HTTP request message, such as an HTTP GET message, to access the attestation report solicitation service). In some embodiments, the token provisioning system 140 may include an authentication challenge (e.g., a nonce generated by the token provisioning system 140) as part of the attestation report solicitation request to be included in any attestation reports provided in response thereto. In some embodiments, the BMC 113, in response to receiving an attestation report solicitation request from the token provisioning system 140, may notify the token provisioning system 140 that the attestation report solicitation request was received and/or that an attestation report solicitation process (or task) had been started. In some embodiments, for example, where the attestation report solicitation request was sent through an attestation report solicitation service, the BMC 113 may provide the notification to the token provisioning system 140 in a response message (e.g., in an HTTP response message).

In some embodiments, the BMC 113, in response to receiving an attestation report solicitation request from the token provisioning system 140, may obtain signed attestation reports (or an attestation report transcript containing the same) from each RoT 115 that it manages (e.g., as previously described). In some embodiments, the BMC 113 may return the signed attestation reports to the token provisioning system 140. In some embodiments, for example, where the attestation report solicitation request was sent through an attestation report solicitation service, the BMC 113 may provide the signed attestation reports to the token provisioning system 140 in a response message (e.g., in an HTTP response message). In some embodiments, the BMC 113 may append a signing certificate (or certificate chain) to each attestation report (or attestation report transcript) containing the device-unique key of the RoT 115 that signed the attestation report (e.g., a device-unique public key of the RoT), before returning the attestation report to the token provisioning system 140. In some embodiments, the BMC 113 may aggregate the signed attestation reports (or attestation report transcripts) received back from each RoT 115 that it manages (which in some embodiments, may include a corresponding signing certificate of the respective RoT 115) to generate an attestation report collection, which may be provided back to the token provisioning system 140 (e.g., in response to the attestation report solicitation request that was initially received).

In some embodiments, the token provisioning system 140 may process each attestation report (or in some embodiments, attestation report transcript) that is returned by the BMC 113 (e.g., using processing logic thereof). In embodiments where the attestation reports (or attestation report transcripts) are provided in an attestation report collection, the token provisioning system 140 may parse the attestation report collection and extract and process the individual attestation reports (or attestation report transcripts) contained therein. In some embodiments, for example, the token provisioning system 140 may attempt verify an attestation report (which in some embodiments may be contained in an attestation report transcript) to ensure that it can be trusted and/or is otherwise suitable for further processing.

In some embodiments, for example, the token provisioning system 140 may attempt to verify a digital signature on the attestation report (or attestation report transcript). In some embodiments, for example, the attestation report (or attestation report transcript) may have been signed by the RoT 115 that generated it and the token provisioning system 140 may attempt to verify the digital signature on the attestation report (or attestation report transcript). In some embodiments, for instance, the RoT 115 may have signed the attestation report (or attestation report transcript) using a device-unique key thereof, which the token provisioning system 140 may attempt to verify using a corresponding key.

In some embodiments, for example, the device-unique key of a RoT 115 may be an asymmetric key comprising a private key and public key. In some embodiments, the RoT 115 may have used the device-unique private key to sign the attestation report (or attestation report transcript), which the token provisioning system 140 may be able to verify using a corresponding device-unique public key. The device-unique public key may be known to the token provisioning system 140 or provided to the token provisioning system 140. In some embodiments, for example, the token provisioning system 140 may maintain a mapping between a serial number of the RoT 115 and a corresponding device-unique public key (e.g., established when the RoT 115 and/or component it secures is first manufactured or placed into production). In such embodiments, the token provisioning system 140 may parse the attestation report (which in some embodiments may be contained within an attestation report transcript) and extract a serial number included therein, based on which the token provisioning system 140 may determine the device-unique public key corresponding thereto (e.g., from the mapping it maintains).

In other embodiments, the device-unique public key may have been provided to the token provisioning system 140 in a certificate (or certificate chain) issued to the RoT 115 by a certificate authority (CA) trusted by the token provisioning system 140 (e.g., for which the token provisioning system 140 has a corresponding root certificate). In some embodiments, for example, the certificate (or certificate chain) with the device-unique public key of the RoT 115 may have been attached to (or otherwise coupled to) the attestation report (or the attestation report transcript). In some embodiments, the token provisioning system 140 may parse the attestation report (or attestation report transcript) and extract the certificate (or certificate chain) therefrom. The token provisioning system 140 may then verify the certificate (or certificate chain) to confirm that it was issued by a trusted CA, and if successfully verified, extract the device-unique public key of the RoT 115 provided therein. In some embodiments, the token provisioning system 140 may attempt to verify the digital signature on the attestation report (or attestation report transcript) using the extracted device-unique public key. In some embodiments, if the token provisioning system 140 is able to verify the signature on the attestation report (or attestation report transcript), it may proceed with further processing (e.g., further verification or additional processing), but if not, the attestation report (or attestation report transcript) may be discarded by the token provisioning system 140 and further processing may be aborted.

In some embodiments, the token provisioning system 140 may also attempt to verify that the attestation report (which in some embodiments may be contained within an attestation report transcript) includes a valid authentication response. In some embodiments, for example, the token provisioning system 140 may parse the attestation report and extract an authentication response included therein that the token provisioning system 140 may compare to an authentication challenge that was included in the attestation report solicitation request that was first issued (e.g., in response to which the attestation report was provided), to ensure that they match. If the token provisioning system 140 is able to verify that the authentication challenge and response match, it may proceed with further processing. If not, the attestation report (or attestation report transcript) may be discarded by the token provisioning system 140 and further processing may be aborted.

In some embodiments, the token provisioning system 140 may further process an attestation report (which in some embodiments may be included within an attestation report transcript) to determine whether the RoT 115 that generated the attestation report should be granted an entitlement token and/or the parameters of the entitlement token to be granted. In some embodiments, for example, the token provisioning system 140 may consider whether the identity and/or state measurements contained within the attestation report satisfies one or more policy criteria, based on which the token provisioning system 140 may be able to determine if an entitlement token should be granted to a RoT 115 and/or the parameters of the entitlement token that is to be granted. A component manufacturer, for example, may have established an entitlement token issuance policy, specifying one or more policy criteria that may need to be met in order for a RoT 115 to be authorized to receive an entitlement token and/or establishing the parameters of the entitlement token the RoT 115 may be authorized to receive.

By way of example, in some embodiments, the token provisioning system 140 may maintain certain information regarding the components it has manufactured and placed into service. The token provisioning system 140, for instance, may maintain a list of the serial numbers of the components and/or the RoTs 115 that secure them, the end-customer associated with the components, the identity of the computing system 110 in which the components are deployed, the identity of the BMC 113 that may manage the components, the firmware versions (of the components and/or the RoTs 115 that secure them) having known security vulnerabilities, the latest firmware version of the component and/or RoT 115, or other relevant information. In some embodiments, the token provisioning system 140 may also maintain information regarding which end-customers are authorized to receive entitlement tokens, the specific software and/or features they are authorized to use, cryptographic keys associated with the software, and/or other relevant information. The token provisioning system 140 may use this information to determine whether a RoT 115 is authorized to receive an entitlement token and/or the parameters of the entitlement token the RoT 115 may be authorized to receive.

In some embodiments, for example, the entitlement token issuance policy may specify that only certain customers are authorized to receive entitlement tokens, that devices using insecure firmware are not authorized to receive entitlement tokens, or other policy criteria. In order to determine whether an entitlement token should be issued, the token provisioning system 140 may determine whether a serial number of a RoT 115 and/or a component it secures (e.g., identified in the attestation report) is associated with a particular end-customer who is authorized to receive an entitlement token, whether the current firmware on a RoT 115 (e.g., identified in the attestation report) is secure (e.g., without any known security vulnerabilities). In some embodiments, the policy criteria may also call for one or more levels of approval. In some embodiments, for example, the issuance of an entitlement token may be condition on the approval of an application engineer, customer service agent, and/or other representative of the component manufacturer 102, who may provide such approval through the token provisioning system 140.

In some embodiments, upon successful verification of the attestation report and satisfaction of the applicable policy criteria, the token provisioning system 140 may generate an entitlement token for the RoT 115, allowing the RoT 115 to take certain action(s) with respect to a component that it secures. In some embodiments, token provisioning system 140 may issue different types of entitlement tokens, which may authorize and/or enable a RoT 115 to take different action(s). By way of example, in some embodiments, the token provisioning system 140 may issue a software authorization token, authorizing and/or enabling a RoT 115 to affect a change in the software on a component it secures. In some embodiments, for example, the token provisioning system 140 may issue a software authorization token authorizing and/or enabling a RoT 115 to install certain software (e.g., a custom firmware image, a software tool, or other software object) onto the component it secures (e.g., onto memory 116 thereof) and/or allow the component to load and execute the software once installed (e.g., to boot from the custom firmware image). In some embodiments, for example, the token provisioning system 140 may include a cryptographic key in the software authorization token that was not previously known to the RoT 115, which can be used by the RoT 115 to verify whether particular software can be trusted (e.g., so that it may be safely installed and/or loaded and executed by a component). In some embodiments, for example, the token provisioning system 140 may include a non-production key (e.g., a non-production public key), which the RoT 115 may be able to use to verify non-production software (e.g., debug software, debug tools, etc.) signed with the non-production key (e.g., using a corresponding non-production private key). In other embodiments, the software authorization token may embed or otherwise include a software object (e.g., microcode, machine code, etc.) therewithin, which the RoT 115 may be able to extract and install. As another example, in some embodiments, the token provisioning system 140 may issue a feature configuration token authorizing and/or enabling a RoT 115 to affect a change in the software and/or hardware features of the component it secures (e.g., to unlock or enable one or more features on the component it secures). In some embodiments, for example, the token provisioning system 140 may issue a feature configuration token identifying one or more features of a software object, which may already be present on the component (e.g., features within a production firmware image), for the RoT 115 to make available for use (e.g., after the entitlement token has been installed).

In some embodiments, the entitlement token may include a number of additional parameters, which may operate to restrict a lifetime and/or scope of the entitlement tokens use. In some embodiments, for example, the token provisioning system 140 may include one or more identity and/or state parameters (e.g., one or more identity and/or state measurements from the attestation report, such as a serial number of the RoT 115 and/or the component it secures, firmware version(s) on the RoT 115 and/or the component it secures, and/or other identity and/or state measurements), which may serve to bind the entitlement token to a particular RoT 115 and component and/or a particular state thereof. In some embodiments, the token provisioning system 140 may include an authentication challenge that was included in the attestation report, as an authentication response, which the RoT 115 may verify (e.g., ensuring that the authentication response matches a current authentication challenge of the RoT 115) before the entitlement token may be installed and/or used. In some embodiments, the inclusion of the authentication response may also serve to control a lifetime of the entitlement token. In some embodiments, for example, the RoT 115 may update its current authentication challenge (e.g., generate a new nonce) under certain conditions (e.g., on each power cycle or boot, after an entitlement token is successfully installed, and/or after a particular amount of time has passed), which may serve to invalidate the entitlement token as it will no longer match the authentication response included therein.

In some embodiments, the token provisioning system 140 may sign an entitlement token, for example, using a cryptographic key that is already known to, or verifiable by, the RoT 115 to which it is being issued. In some embodiments, for example, the token provisioning system 140 may sign the entitlement token with a production key (e.g., a production private key), which the RoT 115 may be able to verify (e.g., using a production non-private key). In some embodiments, for example, the token provisioning system 140 may compute a message digest over the entitlement token using a hashing algorithm (e.g., using an MD5, SHA1, SHA256, or other hashing algorithm), which the token provisioning system 140 may encrypt using the production key (e.g., using the private production key). In some embodiments, the token provisioning system 140 may append the resulting encrypted message digest to (or otherwise couple it to) the entitlement token to sign the entitlement token.

In some embodiments, once an attestation report has been processed, and the appropriate entitlement token has been generated and signed, it may be provided back to the BMC 113 for installation on a corresponding RoT 115 managed thereby. In some embodiments, the token provisioning system 140 may aggregate multiple entitlement tokens (e.g., once all attestation reports in an attestation report collection have been processed and appropriate entitlement tokens have been generated and signed) to generate an entitlement token collection, which may be provided back to the BMC 113 for disaggregation and installation on respective RoTs 115 managed thereby. In some embodiments, the token provisioning system 140 may provide an entitlement token (or entitlement token collection) directly to the BMC 113. In some embodiments, for example, the BMC 113 may provide an entitlement token installation service (or token installation service) to help manage the distribution and installation of entitlement tokens to RoTs 115. In some embodiments, the token provisioning system 140 may be able to issue an entitlement token installation request (or token installation request) to the BMC 113 through the entitlement token installation service (e.g., by sending a message to an outward facing interface of the BMC 113 to invoke the entitlement token installation service). In some embodiments, the token provisioning system 140 may include an entitlement token (or entitlement token collection) as part of the request (e.g., as part of the request message).

In other embodiments, the token provisioning system 140 may provide the entitlement token (or entitlement token collection) to a software distribution system 150, which may include the entitlement token collection within a software update package that may then be distributed to the BMC 113. In some embodiments, the software update package may include one or more software objects (e.g., firmware images) for installation by the BMC 113 (e.g., on the BMC 113 itself and/or the components it manages). In some embodiments, the token provisioning system 140 may identify one or more software objects for the software distribution system 150 to include in a software update package (e.g., software objects that an entitlement token (or entitlement token collection) may authorize and/or enable the RoTs 115 of a computing system 110 to install).

In some embodiments, computing system(s) 110 may be coupled to, and able to communicate with, a software distribution system 150. In some embodiments, the software distribution system 150 may include one or more components, including for example, a system-level processing component (e.g., a CPU, FPGA, ASIC, etc.), one or more additional processing components, switches, controllers, communication interfaces, other system components. In some embodiments, the software distribution system 150 may also be coupled to, and able to communicate with, token provisioning system 140.

In some embodiments, software distribution system 150 may be used to distribute software to a computing system 110 for installation on one or more components thereof. In some embodiments, for example, software distribution system 150 may be able to generate a software update package comprising one or more software objects for installation on the components of a computing system 110. In some embodiments, for example, the software distribution system 150 may generate a software update package including special software (e.g., custom debug firmware, helpful debug tools, etc.) for installation on components of the computing system 110.

In some embodiments, the software distribution system 150 may provide the software update package to a BMC 113 of the computing system 110 for installation on components managed thereby. In some embodiments, the BMC 113 may provide a software update service to help facilitate the distribution and installation of software onto components of computing system 110 managed thereby. In some embodiments, the software distribution system 150 may invoke the software update service by sending a message to the interface and may include a software update package as part the message. In some embodiments, the software update service provided by the BMC 113 may operate in accordance with the PLDM standard (e.g., including the PLDM for Firmware Update Specification). In such embodiments, the software distribution system 150 may generate a software update package that conforms to the PLDM standard. A PLDM software update package (or PLDM package), for example, may include a package header along with one or more software objects (e.g., firmware images). The package header may include a header information portion (e.g., describing the package version, date, etc.), component identifier records (describing the components, including downstream components, the update is intended for), package content information (e.g., describing the software images contained within the package, including for example, their classification, offset, size, and version), and a checksum.

In some embodiments, the token provisioning system 140 may provide an entitlement token (or entitlement token collection) that it generates to the software distribution system 150 to be included as part of a software update package provided to a computing system 110. In some embodiments, the software distribution system 150 may include an entitlement token (or entitlement token collection) received from token provisioning system 140 in software update package. In some embodiments, for example, the software distribution system 150 may include an entitlement token (or entitlement token collection) as a "dummy" software object intended for a "dummy" component, which a BMC 113 may be able to identify as such. In some embodiments, for example, a special component identifier (e.g., a specific UUID) and/or software object identifier (e.g., 0xDEAD or 57005) may be used in the PLDM package header to indicate that a software object is an entitlement token (or entitlement token collection). In some embodiments, the token provisioning system 140 may also provide the software distribution system 150 with an identification of one or more software objects to be included in the software update package with the entitlement token (or entitlement token collection) (e.g., software objects that an entitlement token (or entitlement token collection) may authorize and/or enable the RoTs 115 of a computing system 110 to install). The software distribution system 150 may generate the software update package with the entitlement token (or entitlement token collection) and/or one or more software objects and provide them to BMC 113 for installation on computing system 110. In some embodiments, the BMC 113 may notify the software distribution system 150 when it starts to process and/or finishes processing the software update package (e.g., once the entitlement tokens (or entitlement token collections) and/or software objects therein have been installed).

Figure 2:
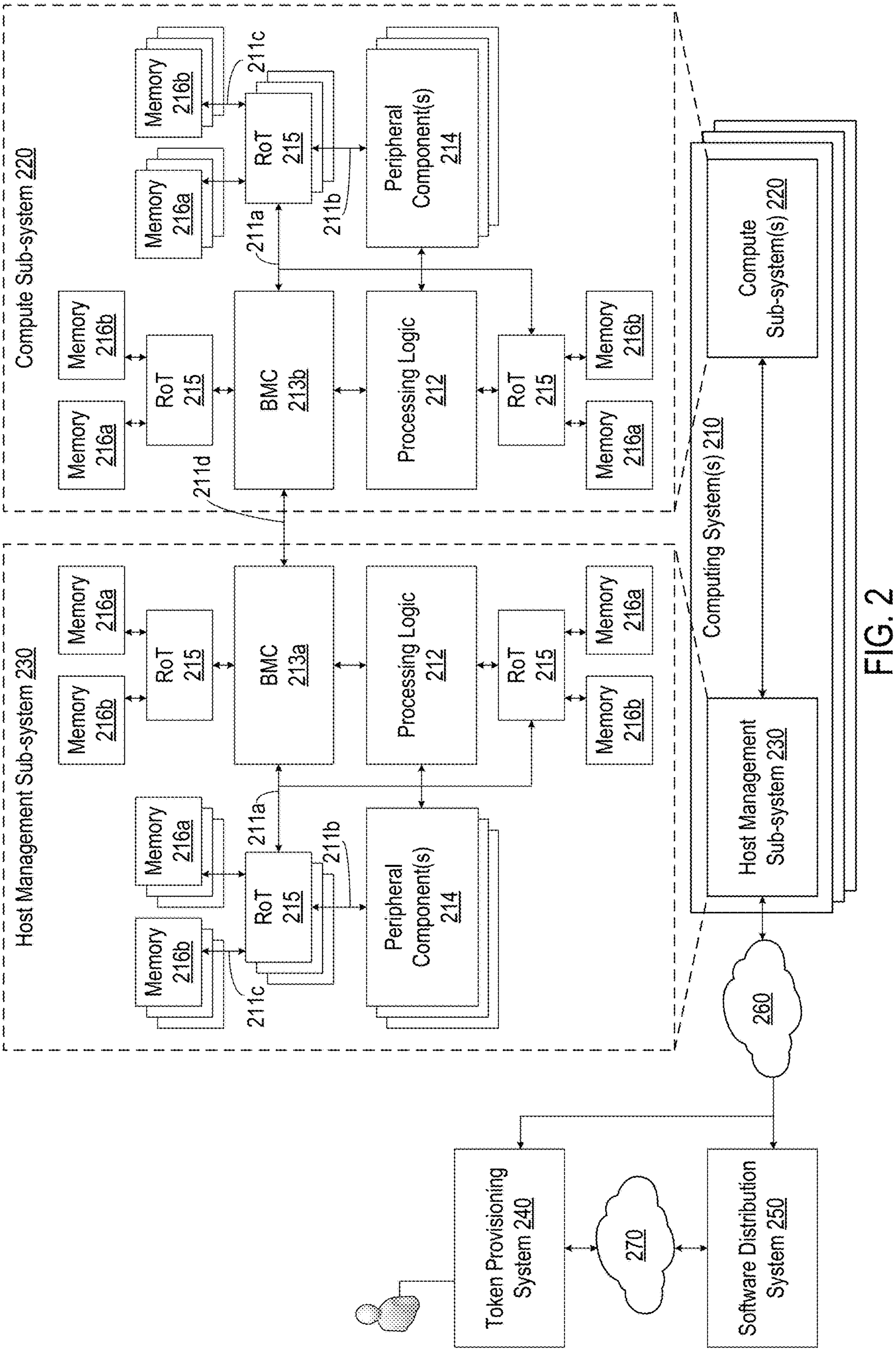
FIG. 2 illustrates a block diagram of an example computing environment, in accordance with at least one embodiment.

FIG. 2 is a block diagram of an example computing environment 200, according to at least one embodiment. As illustrated in FIG. 2, computing environment 200 may include one or more computing system(s) 210, a token provision system 240, and in some embodiments, a software distribution system 250. The computing environment 200 is similar to that of computing environment 100 illustrated in FIG. 1 (and described above with respect thereto). The systems in computing environment 100 (e.g., computing system(s) 110, token provisioning system 140, software distribution system 150, and communication networks 160 and 170) are similar to those of computing environment 200 (e.g., to computing system(s) 210, token provisioning system 240, software distribution system 250, and communication networks 260 and 270, respectively), and so, for the sake of brevity, their structure, function, and operation are not repeated herein, except insofar as may be necessary to explain how they differ.

In particular, the example computing system 210 illustrated in FIG. 2 is relatively more complex than the computing system 110 shown in FIG. 1 (and described above with respect thereto). In some embodiments, for example, computing system 210 may include a number of computing sub-systems (e.g., each of which may be similar to computing system 110). By way of example, in some embodiments, computing system 210 may be a high-performance computing system that includes a number of different server sub-systems, for example, a host management system 220, one or more compute sub-systems 230, and/or one or more storage sub-systems (not shown), which may work together to perform computationally intensive workloads (e.g., in support of artificial intelligence (AI) or other HPC applications). Each sub-system of computing system 210, in turn, may include its own system-level processing component, or processing logic 212, and peripheral components 214. Each sub-system may also include its own baseboard management controllers, for example, BMC 213*a* and BMC 213*b*, which may perform different management functions with respect to respective computing sub-systems, for example, with respect to host management sub-system 220 and compute sub-system(s) 230, respectively.

In some embodiments, the host management sub-system 220 may be used to manage and coordinate operation of the different compute sub-system(s) 230 and/or other sub-systems (e.g., storage sub-systems) (not shown). In some embodiments, the BMCs 213 may be arranged and configured to operate in a hierarchical manner, for example, with BMCs at a higher layer being able to manage one or more BMCs in a lower layer. In some embodiments, for example, BMC 213*a* of host management sub-system 220 may be used to manage one or more BMCs 213*b* of compute sub-system(s) 230. In some embodiments, BMC 213*a* may be able to perform different management functions with respect to compute sub-system(s) 230 and their components through BMCs 213*b*.

In some embodiments, for example, BMC 213*a* of host management sub-system 220 may be coupled to and able to communicate with BMCs 213*b* of compute of compute sub-system(s) 230, for example, over a communication bus 211*d* (e.g., a universal serial bus (USB), an $I^2C$ bus) or communication network using communication interfaces thereof (e.g., a USB interface, an $I^2C$ interface, network communication interface, or other communication interface). In some embodiments, BMCs 213 may each provide an outward facing interface (e.g., a Redfish API or Redfish service) through which a sub-system (e.g., host management sub-system 220 or compute sub-system 230) and its components may be managed (e.g., similar to BMC 113 as described above with respect thereto). In some embodiments, BMC 213*a* may be able to perform different management functions with respect to compute sub-system(s) 230 and their components via outward facing interfaces of BMCs 213*b* (e.g., via a Redfish API or Redfish service thereof).

In some embodiments, token provisioning system 240 may be used to issue entitlement tokens to RoTs 215 of computing system(s) 210, which may authorize and/or enable the RoTs 215 to take certain action(s) with respect to the components they secure (e.g., to affect a change in the software and/or features available on the components). In some embodiments, for example, the token provisioning system 240 may issue entitlement tokens based on an end-to-end challenge response performed between the token provisioning system 240 and one or more RoTs 215 of a computing system 210. In some embodiments, for instance, the token provisioning system 240 may solicit an attestation report from each of the RoTs 215, which may provide an attestation as to an identity and/or state of the RoT 215 and/or a component it secures, based on which the token provisioning system 240 may issue an entitlement token.

In some embodiments, for example, the token provisioning system 240 may issue an attestation report solicitation request to BMC 213*a* of the host-management sub-system 220, for example, through an attestation report solicitation service provided thereby (e.g., in a similar manner to that of token provisioning system 140 and BMC 113 as described above with respect thereto). In some embodiments, for example, an application engineer or other representative of the component manufacturer 102 (e.g., to whom an end-customer may have reported an issue or requested special software and/or enablement of special features) may cause the token provisioning system 240 to issue an attestation report solicitation request to BMC 213*a* of the host-management sub-system 220.

In some embodiments, the BMC 213*a*, in response to receiving an attestation report solicitation request from the token provisioning system 240, may request an attestation report from each RoT 215 that it manages (e.g., in a similar manner to BMC 113 as described above with respect thereto). In some embodiments, in response to receiving an attestation request from BMC 213*a*, each RoT 215 managed by BMC 213*a* may generate a signed attestation report (e.g., in a similar manner to RoT 115 as described above with respect thereto). In some embodiments, the BMC 213*a*, in response to receiving an attestation report solicitation request from the token provisioning system 240, may also forward (or proxy) the request to each BMC 213*b* that it manages. In some embodiments, a BMC 213*b*, in response to receiving an attestation report solicitation request from BMC 213*a*, may request an attestation report from each RoT 215 that it manages (e.g., in a similar manner to BMC 113 as described above with respect thereto). In some embodiments, in response to receiving an attestation request from BMC 213*b*, each RoT 215 managed by BMC 213*b* may generate a signed attestation report (e.g., in a similar manner to RoT 115 as described above with respect thereto).

In some embodiments, a BMC 213*b* may provide the signed attestation reports received from each RoT 215 that it manages to BMC 213*a* (e.g., in a similar manner to BMC 113 providing attestation reports to token provisioning system 140 as described above with respect thereto). In some embodiments, a BMC 213*b* may aggregate the signed attestation reports (or attestation report transcripts) received back from each RoT 215 that it manages (which in some embodiments, may include a corresponding signing certificate of the respective RoT 215) to generate an attestation report collection. In some embodiments, the BMC 213*b* may provide the attestation report collection back to the BMC 213*a* (e.g., in response to the attestation report solicitation request that was initially forwarded by BMC 213*a*). In some embodiments, the BMC 213*b* may record (or cache) the identity of the RoTs 215 from which attestation reports were received, which the BMC 213*b* may later use to facilitate the distribution and installation of entitlement tokens that are received in response (e.g., from token provisioning system 240 through BMC 213*a*). In some embodiments, for example, the BMC 213*b* may maintain a mapping of a globally unique device identifier of a RoT 215 (e.g., a UUID the RoT 215), obtained from the RoT 215 (e.g., through the exchange of MCTP control messages therewith), and a serial number of the RoT 215 and/or a component it secures, obtained from the attestation report provided by the RoT 215. In some embodiments, an entitlement token that is issued in response to the attestation report may specify a serial number of the RoT 215 and/or component for which it is intended, based on which the BMC 213*b* may be able to determine a corresponding device identifier (e.g., from the mapping that was recorded) to which the entitlement token should be provided for installation.

In some embodiments, BMC 213*a* may provide the signed attestation reports received from each RoT 215 that it manages, as well as those received from each BMC 213*b* it manages, to token provisioning system 240 (e.g., in a similar manner to BMC 113 providing attestation reports to token provisioning system 140 as described above with respect thereto). In some embodiments, BMC 213*a* may aggregate the signed attestation reports (or attestation report transcripts) received back from each RoT 215 that it manages (which in some embodiments, may include a corresponding signing certificate of the respective RoT 215), as well as those received from each BMC 213*b* it manages, to generate an attestation report collection. In some embodiments, BMC 213*a* may provide the attestation report collection to token provisioning system 240 (e.g., in a similar manner to BMC 113 providing attestation reports to token provisioning system 140 as described above with respect thereto).

In some embodiments, the BMC 213*a* may record (or cache) the identity of the RoTs 215 from which attestation reports were received, as well as the BMCs 213*b* from which attestation reports were received, which the BMC 213*a* may later use to facilitate the distribution and installation of entitlement tokens that are received in response (e.g., from token provisioning system 240). In some embodiments, for example, the BMC 213*a* may maintain a mapping of a globally unique device identifier of a RoT 215 (e.g., a UUID of the RoT 215), obtained from the RoT 215 (e.g., through the exchange of MCTP control messages therewith), and a serial number of the RoT 215 and/or a component it secures, obtained from the attestation report provided by the RoT 215. In some embodiments, with respect to attestation reports received from BMCs 213*b*, the BMC 213*a* may maintain a mapping of a globally unique device identifier of a BMC 213*b* (e.g., a UUID of the BMC 213*b*), obtained from the BMC 213*b* (e.g., through the exchange of MCTP control messages therewith), and a serial number of each RoT 215 and/or a component it secures for which an attestation report was received from BMC 213*b*, obtained from the attestation reports provided by the BMC 213*b*. In some embodiments, an entitlement token that is issued in response to the attestation reports may specify a serial number of the RoT 215 and/or component for which it is intended, based on which the BMC 213*a* may be able to determine a corresponding device identifier (e.g., from the mapping that was recorded) of the BMC 213*b* to which the entitlement token should be forwarded (e.g., for installation on a RoT managed thereby).

In some embodiments, the token provisioning system 240 may process each attestation report returned by the BMC 213*a* (e.g., each attestation report in the attestation report collection) and (e.g., upon verification of the attestation report and/or satisfaction of one or more policy criteria) generate an entitlement token for the RoT 115 that generated a respective attestation report (e.g., in a similar manner to token provisioning system 140 as described above with respect thereto). In some embodiments, an entitlement token that is generated may be provided back to the BMC 213*a* for installation on a corresponding RoT 215 managed thereby or for forwarding to a BMC 213*b* (e.g., for installation on a corresponding RoT 215 managed by the BMC 213*b*). In some embodiments, the token provisioning system 240 may aggregate multiple entitlement tokens to generate an entitlement token collection, which may be provided back to the BMC 213*a* for disaggregation and installation on respective RoTs 215 or forwarding to respective BMCs 213*b* managed thereby (e.g., for installation on respective RoTs 215 managed by the BMCs 213*b*).

In some embodiments, the token provisioning system 240 may provide an entitlement token (or entitlement token collection) directly to the BMC 213*a* (e.g., in a similar manner to token provisioning system 140 and BMC 113 as described above with respect thereto). In embodiments where an entitlement token collection was provided to the BMC 213*a*, the BMC 213*a* may extract and process the individual entitlement tokens contained therein. In some embodiments, the BMC 213*a* may process a received entitlement token to determine a RoT 215 for which it is intended or a BMC 213*b* to which it should be forwarded and provide it to the identified RoT 215 for installation or BMC 213*b* for processing (e.g., for installation on RoTs 215 managed thereby). In some embodiments, for example, the BMC 213 may have recorded (or cached) the identity of the RoTs 215 and/or BMC 213*b* from which attestation reports were received. In some embodiments, the BMC 213*a* may parse an entitlement token that is received and extract a serial number specified therein (e.g., of a RoT 215 and/or component it secures). The BMC 213*a* may match the extracted serial number to a corresponding device identifier (e.g., from the mapping that was recorded) to identify the RoT 215 or BMC 213*b* for which the entitlement token should be provided for installation.

In some embodiments, the BMC 213*a* may issue an entitlement token installation command to an identified RoT 215 and provide the entitlement token to the RoT 215 for installation thereby, for example, as part of the entitlement token installation command (e.g., in a similar manner to BMC 113 and RoT 115 as described above with respect thereto). In some embodiments, the BMC 213*a* may forward an entitlement token to an identified BMC 213*b*, for example, as part of an entitlement token installation request (e.g., issued through entitlement token installation service of the BMC 213*b*). In some embodiments, the BMC 213*a* may aggregate multiple entitlement tokens intended for a BMC 213*b* to generate an entitlement token collection, which may be provided to the BMC 213*b* for disaggregation and installation on respective RoTs 215 managed thereby. In some embodiments, a BMC 213*b* upon receipt of an entitlement token (or entitlement token collection) (e.g., as part of an entitlement token installation request received from BMC 213*a*), may process the entitlement token, or extract and process each entitlement token in an entitlement token collection (e.g., in a similar manner as just described with respect to BMC 213*a* and the RoTs 215 that it manages).

In other embodiments, the token provisioning system 240 may provide the entitlement token (or entitlement token collection) to a software distribution system 250, which may include the entitlement token collection within a software update package that may then be distributed to the BMC 213*a* (e.g., in a similar manner to token provisioning system 140, software distribution system 150, and BMC 113 as described above with respect thereto). In some embodiments, upon receipt of a software update package (e.g., via a request issued to the software update service), the BMC 213*a* may attempt to process the software update package (e.g., in a similar manner to BMC 113 as described above with respect thereto). In some embodiments, the BMC 213*a* may examine the software update package to determine if an entitlement token (or entitlement token collection) is included therein. In some embodiments, for example, the BMC 213*a* may parse a package header to identify a dummy software object within the package that comprises the entitlement token (or entitlement token collection). In some embodiments, for example, the entitlement token (or entitlement token collection) may be identified with a special component identifier (e.g., a specific dummy component UUID) and/or as a special software object identifier (e.g., 0xDEAD or 57005) within the package header. In some embodiments, the BMC 213*a* may extract the identified software object (e.g., based on associated package information in the header, such as a package offset and object size), comprising the entitlement token (or entitlement token collection), for processing as just described with respect to embodiments in which the entitlement token (or entitlement token collection) was received directly from token provisioning system 240.

In some embodiments, after all entitlement tokens have been processed, the BMC 213*a* may process the remaining software objects in the software update package (e.g., in a similar manner to BMC 113 as described above with respect thereto). In some embodiments, for example, the BMC 213*a* may parse the software update package to identify the software objects intended for one or more components managed by the BMC 213*a*. In some embodiments, the BMC 213*a* may extract the identified software objects and provide them to appropriate RoTs 215 for installation on the RoTs 215 or components they secure (e.g., as part of a software installation command). In some embodiments, the BMC 213*a* may parse the software update package to identify the software objects intended for one or more components managed indirectly through the BMCs 213*b* it manages. In some embodiments, the BMC 213*a* may extract the identified software objects and provide them to appropriate BMCs 213*b* (e.g., through a software update service thereof) for installation by RoTs 215 managed thereby (e.g., in a similar manner as just described).

Figure 3:
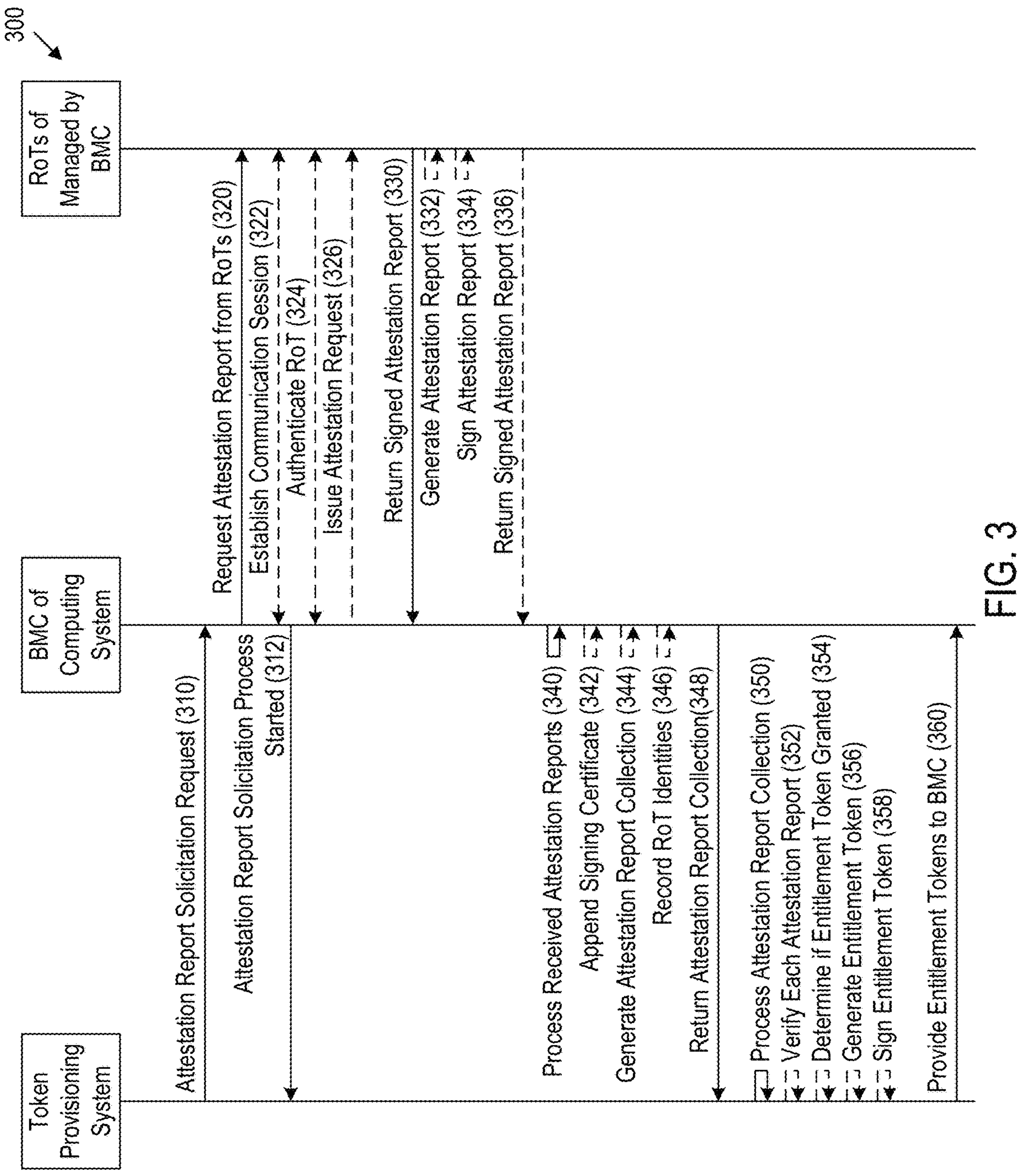
FIG. 3 illustrates a flow diagram of an example method for issuing entitlement tokens, according to at least one embodiment.
Figure 4:
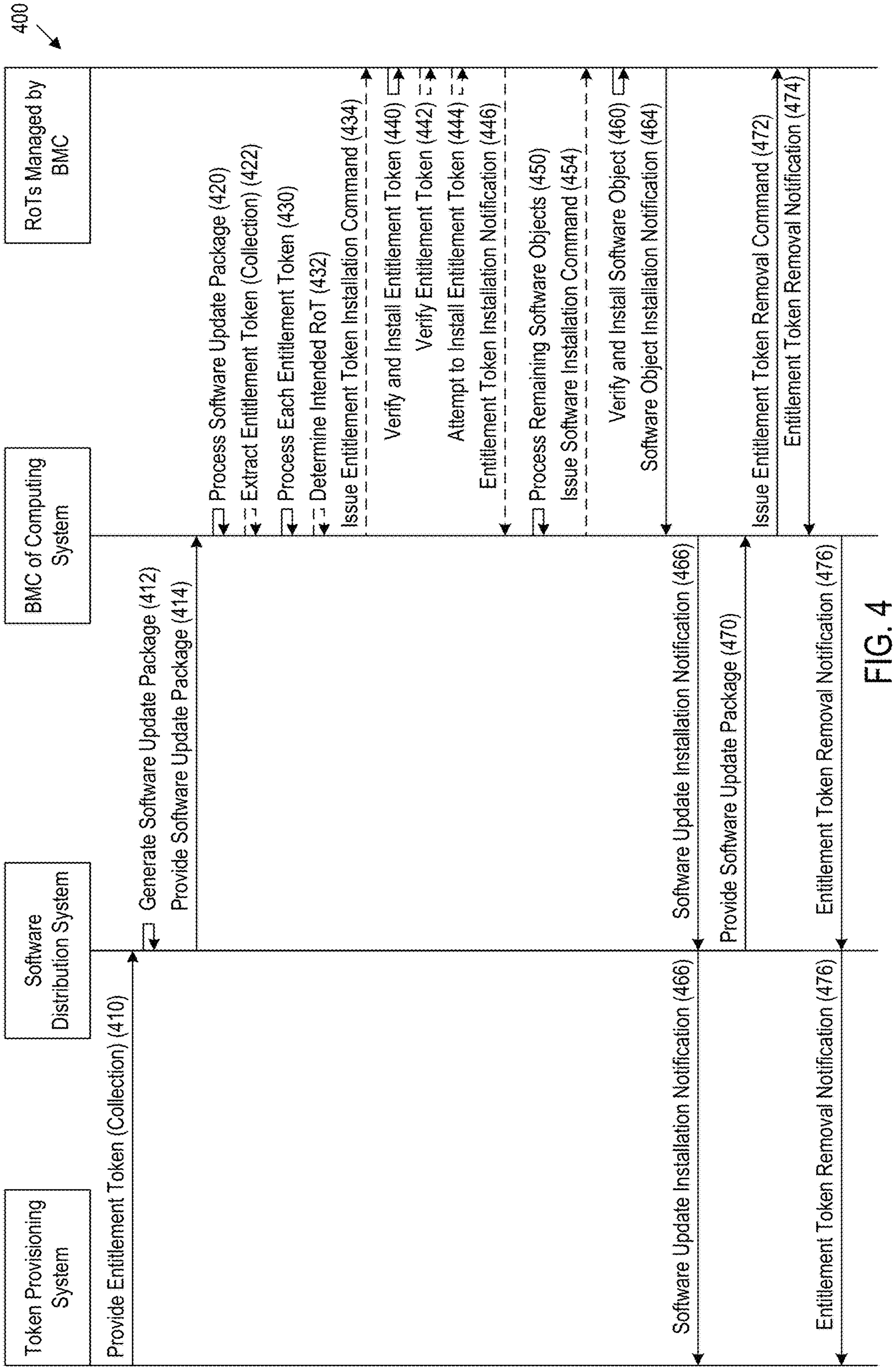
FIG. 4 illustrates a flow diagram of an example method for installing entitlement tokens, according to at least one embodiment.

FIGS. 3-4 illustrate example methods in accordance with embodiments of the present disclosure. For the sake of simplicity and clarity, these methods are depicted and described as a series of operations. However, in accordance with the present disclosure, such operations may be performed in other orders and/or concurrently, and with other operations not presented or described herein. Furthermore, not all illustrated operations may be required in implementing methods in accordance with the present disclosure. Those of skill in the art will also understand and appreciate that the methods could be represented as a series of interrelated states or events via a state diagram. Additionally, it will be appreciated that the disclosed methods are capable of being stored on an article of manufacture. The term “article of manufacture,” as used herein, is intended to encompass a computer-readable device or storage media provided with a computer program and/or executable instructions that, when executed, affect one or more operations.

FIG. 3 illustrates a flow diagram of an example method 300 for issuing entitlement tokens, according to at least one embodiment. In some embodiments, method 300 may involve a token provisioning system issuing entitlement tokens to one or more RoTs of a computing system, authorizing and/or enabling the RoTs to take certain action(s) with respect to one or more components they secure (e.g., to affect a change in the software and/or features available on a component). In some embodiments, for instance, entitlement tokens may be issued to a RoT to allow the RoT to install special software (e.g., custom debug firmware, helpful debug tools, etc.) and/or enable certain restricted features (e.g., verbose logging, ultra-high frequency operation, unlimited hash rate computation, etc.) on a component. In some embodiments, entitlement tokens may be issued based on an end-to-end challenge-response performed between a token provisioning system and one or more RoTs of a computing system (e.g., between the token provisioning system 140 and one or more RoTs 115 of computing system 110 in FIG. 1). The operations of method 300 may be performed by processing logic of the token provisioning system, the RoTs of the computing system, and/or one or more other components thereof (e.g., by processing logic of the token provisioning system 140, computing system(s) 110, and/or BMCs 113 or RoTs 115 thereof).

In some embodiments, at operation 310, the token provisioning system (e.g., using processing logic thereof) may solicit an attestation report from one or more RoTs of a computing system, which may provide an attestation as to an identity and/or state of the RoT and/or a component it secures, based on which the token provisioning system may issue an entitlement token. In some embodiments, for example, the token provisioning system may issue an attestation report solicitation request to a BMC of a computing system, for example, through an attestation report solicitation service provided thereby. In some embodiments, for example, an application engineer or other representative of the component manufacturer (e.g., to whom an end-customer may have reported an issue or requested special software and/or enablement of special features) may cause the token provisioning system to issue an attestation report solicitation request to a BMC of the computing system. In some embodiments, for instance, the BMC of the computing system (e.g., using processing logic thereof) may provide an outward facing interface (e.g., a Redfish API or Redfish service) through which the token provisioning system may invoke the attestation report solicitation service by sending a message to the interface (e.g., by sending an HTTP request message, such as an HTTP GET message, to access the attestation report solicitation service). In some embodiments, the token provisioning system may include an authentication challenge (e.g., a nonce) as part of the attestation report solicitation request to be included in any attestation reports provided in response thereto.

In some embodiments, at operation 312, the BMC of the computing system (e.g., using processing logic thereof), in response to receiving an attestation report solicitation request from the token provisioning system, may notify the token provisioning system that the attestation report solicitation request was received and/or that an attestation report solicitation process (or task) had been started. In some embodiments, for example, where the attestation report solicitation request was sent through an attestation report solicitation service, the BMC may provide the notification to the token provisioning system in a response message (e.g., in an HTTP response message).

In some embodiments, at operation 320, the BMC, in response to receiving an attestation report solicitation request from the token provisioning system, may request an attestation report from each RoT that it manages (e.g., using processing logic thereof). In some embodiments, operation 320 may involve one or more suboperations (illustrated in FIG. 3 using dashed lines). In some embodiments, for example, at sub-operation 322, the BMC and a RoT (e.g., using processing logic thereof) may negotiate and establish a secure communication session. In some embodiments, for instance, where the BMC and RoT communicate with each other using the SPDM protocol, the BMC and RoT may exchange a sequence of one or more SPDM messages to negotiate and establish a secure communication session. In some embodiments, for example, the BMC may send a GET_VERSION message and the RoT may respond with a VERSION message, to discover what SPDM version(s) may be commonly supported by the BMC and RoT. The BMC may then send a GET_CAPABILITES message and the RoT may respond with a CAPABILITIES message, indicating the capabilities the RoT supports. The BMC may then send a NEGOTIATE_ALGORITHMS message, advertising the cryptographic algorithms supported by the BMC, and the RoT may respond with an ALGORITHMS message, selecting the cryptographic algorithms that are to be used for the communication session.

In some embodiments, at sub-operation 324, the BMC may authenticate the RoT (e.g., using processing logic thereof). In some embodiments, for example, where the BMC and RoT communicate with each other using the SPDM protocol, the BMC and RoT may exchange a sequence of one or more SPDM messages to authenticate the RoT. In some embodiments, for instance, the BMC may send a GET_DIGESTS message and the RoT may respond with a DIGEST message, containing digests for the different signing certificate(s) (or certificate chain(s)) available on the RoT. The BMC may then request, and the RoT may respond with, a particular certificate (or certificate chain), through the exchange of one or more GET_CERTIFICATE request messages and CERTIFICATE response messages (the number of which may depend on the size of the certificate or certificate chain). In some embodiments, the certificate (or certificate chain) that is provided by the RoT may contain a device-unique cryptographic key (e.g., a device-unique public key of the RoT), which the BMC may use to verify a signature on messages received from the RoT thereafter. In some embodiments, the BMC may then send a CHALLENGE message (e.g., containing a nonce generated by the BMC) and the RoT may respond with a CHALLENGE_AUTH message signed by the RoT using a cryptographic key corresponding to a particular certificate (e.g., a corresponding device-unique private key of the RoT). In some embodiments, the BMC may verify the signature on the CHALLENGE_AUTH message to authenticate the RoT.

In some embodiments, at sub-operation 326, the BMC (e.g., using processing logic thereof) may issue an attestation report request (or attestation request) to each RoT it manages, requesting an attestation as to an identity and/or state of the RoT and/or a component it secures. In some embodiments, the BMC may include the authentication challenge from the attestation report solicitation request, received by the BMC from the token provisioning system, as part of the attestation request issued to a RoT, for the RoT to include as part of the attestation report that it returns.

In some embodiments, for example, where the BMC and RoT communicate with each other using the SPDM protocol, the BMC may send a GET_MEASUREMENTS measurement message to the RoT, requesting the attestation report from the RoT. In some embodiments, the GET_MEASUREMENTS message may include a measurement operation parameter requesting a measurement at a particular index value (e.g., 0x32 or 50), which the RoT may understand as requesting an attestation report. In some embodiments, the GET_MEASUREMENT message may include the authentication challenge from the attestation report solicitation request received by the BMC from the token provisioning system (e.g., at operation 310).

In some embodiments, at operation 330, a RoT (e.g., using processing logic thereof), in response to receiving an attestation request, may generate and return a signed attestation report. In some embodiments, operation 330 may involve one or more suboperations (illustrated in FIG. 3 using dashed lines). In some embodiments, for example, at sub-operation 332, a RoT (e.g., using processing logic thereof) may generate an attestation report that includes one or more measurements regarding an identity and/or state (e.g., a current hardware and/or software state) of the RoT or a component it secures. In some embodiments, for example, the attestation report may include measurements regarding immutable software code, mutable software code, boot stages, configuration data, and/or other state variables of the RoT or the component it secures. In some embodiments, for instance, the attestation report generated by a RoT may include a serial number of the RoT and/or a component (or components) it secures, current firmware version(s) on the RoT and/or a component (or components) it secures, and/or other identity and/or state measurements.

In some embodiments, the attestation report generated by a RoT may include one or more additional parameters. In some embodiments, for instance, the RoT may include an authentication challenge (e.g., a nonce generated by the token provisioning system) included as part of the attestation request that was received (e.g., from BMC). In some embodiments, the attestation report generated by a RoT may also include (another) authentication challenge (e.g., a nonce generated by the RoT) to be included in any entitlement token issued by the token provisioning system in response thereto In some embodiments, for example, a RoT may maintain a current authentication challenge (e.g., in a memory thereof), to be included in an attestation report that it generates. In some embodiments, a RoT 315 may update the authentication challenge (e.g., generate a new nonce) under certain conditions (e.g., on each power cycle or boot, after an entitlement token is successfully installed, and/or after a particular amount of time has passed).

In some embodiments, at sub-operation 334, the RoT (e.g., using processing logic thereof) may sign the attestation report it generated (e.g., at sub-operation 332) with a cryptographic key that is unique to the RoT (e.g., a physical unclonable function (PUF)-based key). In some embodiments, for example, a RoT may compute a message digest over the attestation report using a hashing algorithm (e.g., using an MD5, SHA1, SHA356, or other hashing algorithm), which the RoT may encrypt using the device-unique key. In some embodiments, the RoT may append the encrypted message digest (or signature) to the attestation report to sign the attestation report.

In some embodiments, at sub-operation 336, the RoT (e.g., using processing logic thereof) may provide the signed attestation report back to the BMC (e.g., in response to the attestation request issued at sub-operation 326). In some embodiments, for example, where the BMC and RoT communicate with each other using the SPDM protocol, the RoT may respond (e.g., to a GET_MEASUREMENT message issued at sub-operation 326) with a MEASUREMENT message containing the signed attestation report. In some embodiments, the MEASUREMENT message may itself be signed by the RoT (e.g., using a device-unique cryptographic key), with the signature being appended thereto. In some embodiments, the signature may be over both the attestation request (e.g., the GET_MEASUREMENT request message) and the attestation report provided in response (e.g., the MEASUREMENT message) being sent in response (collectively, the MEASUREMENT "transcript").

In some embodiments, at operation 340, the BMC (e.g., using processing logic thereof) may process the attestation reports received back from the RoTs. In some embodiments, operation 340 may involve one or more suboperations (illustrated in FIG. 3 using dashed lines). In some embodiments, for example, at sub-operation 342, the BMC (e.g., using processing logic thereof) may append a signing certificate (or certificate chain) to each attestation report containing the device-unique key of the RoT that signed the attestation report. In some embodiments, for example, the certificate may have been provided to the BMC by the RoT as part of establishing communication therebetween (e.g., at sub-operation 324). In some embodiments, where the RoT provides the attestation report in a signed response message that was signed over both the attestation request message and the attestation response message (or attestation report transcript), the RoT may append the certificate (or certificate chain) containing the device-unique key of the RoT thereto.

In some embodiments, at sub-operation 344, the BMC (e.g., using processing logic thereof) may aggregate the signed attestation reports (or attestation report transcripts) received back from each RoT that it manages (which in some embodiments, may also include a corresponding signing certificate of the respective RoT, which may have been appended thereto at sub-operation 342) to generate an attestation report collection.

In some embodiments, at sub-operation 346, the BMC (e.g., using processing logic thereof) may record (or cache) the identity of the RoT from which an attestation report was received, which the BMC may later use to facilitate the distribution and installation of entitlement tokens received in response to the attestation reports from the token provisioning system. In some embodiments, for example, the BMC may maintain a mapping of a globally unique device identifier of a RoT (e.g., a UUID of the RoT) and a serial number of the RoT and/or a component it secures. In some embodiments, for instance, where the BMC and a RoT communicate according to the MCTP protocol, the BMC may obtain the UUID of a RoT through the exchange of control messages therewith and may obtain the serial number from the attestation report of the RoT.

In some embodiments, at operation 348, the BMC (e.g., using processing logic thereof) may provide the attestation report collection back to the token provisioning system. (e.g., in response to the attestation report solicitation request that was issued at operation 310). In some embodiments, for example, where the attestation report solicitation request was sent through an attestation report solicitation service of the BMC, the BMC may provide the attestation report collection to the token provisioning system in a response message (e.g., in an HTTP response message).

In some embodiments, at operation 350, the token provisioning system (e.g., using processing logic thereof) may process each attestation report (or in some embodiments, attestation report transcript) that is returned by the BMC. In embodiments where the attestation reports (or attestation report transcripts) are provided in an attestation report collection, the token provisioning system may parse the attestation report collection and extract and process the individual attestation reports (or attestation report transcripts) contained therein (e.g., sequentially and/or in parallel).

In some embodiments, for example, at sub-operation 352, the token provisioning system (e.g., using processing logic thereof) may attempt verify an attestation report (which in some embodiments may be contained in an attestation report transcript) to ensure that it can be trusted and/or is otherwise suitable for further processing. In some embodiments, for example, at sub-operation 352, the token provisioning system (e.g., using processing logic thereof) may attempt to verify a digital signature of the attestation report (or attestation report transcript). In some embodiments, for instance, a RoT may have signed the attestation report (or attestation report transcript) using a device-unique key thereof, which the token provisioning system may attempt to verify using a corresponding key. In some embodiments, for example, the device-unique key may be an asymmetric key comprising a device-unique private key, which the RoT may have used to sign the attestation report, and a device-unique public key, which may be known to the token provisioning system or provided to the token provisioning system, which the token provisioning system may use to verify the signature on the attestation report.

In some embodiments, for example, the token provisioning system may maintain a mapping between a serial number of the RoT and a corresponding device-unique public key (e.g., established when the RoT and/or component it secures is first manufactured or placed into production). In such embodiments, the token provisioning system may parse the attestation report (which in some embodiments may be contained within an attestation report transcript) and extract a serial number included therein, based on which the token provisioning system may determine the device-unique public key corresponding thereto (e.g., from the mapping it maintains).

In other embodiments, the device-unique public key may have been provided to the token provisioning system in a certificate (or certificate chain) issued to the RoT by a certificate authority (CA) trusted by the token provisioning system (e.g., for which the token provisioning system has a corresponding root certificate). In some embodiments, for example, the certificate (or certificate chain) with the device-unique public key of the RoT may have been attached to (or otherwise coupled to) the attestation report (or the attestation report transcript). In some embodiments, the token provisioning system may parse the attestation report (or attestation report transcript) and extract the certificate (or certificate chain) therefrom. The token provisioning system 340 may then verify the certificate (or certificate chain) to confirm that it was issued by a trusted CA, and if successfully verified, extract the device-unique public key of the RoT provided therein. In some embodiments, if the token provisioning system is able to verify the signature on the attestation report (or attestation report transcript), it may proceed with further processing (e.g., at sub-operation **352*b*). If not, the attestation report (or attestation report transcript) may be discarded by the token provisioning system and processing of the attestation report may be aborted (e.g., with the method 300 returning to sub-operation 352** to process a next attestation report).

In some embodiments, for example, at sub-operation 352, the token provisioning system (e.g., using processing logic thereof) may also attempt to verify that the attestation report (which in some embodiments may be contained within an attestation report transcript) includes a valid authentication response. In some embodiments, for example, the token provisioning system may parse the attestation report and extract an authentication response included therein that the token provisioning system may compare to an authentication challenge that was included in the attestation report solicitation request that was first issued (e.g., at operation 310), to ensure that they match. If the token provisioning system is able to verify that the authentication challenge and response match, it may proceed with further processing (e.g., at sub-operation 354). If not, the attestation report (or attestation report transcript) may be discarded by the token provisioning system and processing of the attestation report may be aborted (e.g., with the method 300 returning to sub-operation **352*a*** to process a next attestation report).

In some embodiments, at sub-operation 354, the token provisioning system (e.g., using processing logic thereof) may process an attestation report (which in some embodiments may be included within an attestation report transcript) to determine whether the RoT that generated the attestation report should be granted an entitlement token and/or the parameters of the entitlement token to be granted. In some embodiments, for example, the token provisioning system may consider whether the identity and/or state measurements contained within the attestation report satisfies one or more policy criteria, based on which the token provisioning system may be able to determine if an entitlement token should be granted to a RoT and/or the parameters of the entitlement token that is to be granted. A component manufacturer, for example, may have established an entitlement token issuance policy, specifying one or more policy criteria that may need to be met in order for a RoT to be authorized to receive an entitlement token and/or establishing the parameters of the entitlement token the RoT may be authorized to receive.

In some embodiments, for example, the entitlement token issuance policy may specify that only certain customers are authorized to receive entitlement tokens, that devices using insecure firmware are not authorized to receive entitlement tokens, or other policy criteria. In order to determine whether an entitlement token should be issued, the token provisioning system may determine whether a serial number of a RoT and/or a component it secures (e.g., identified in the attestation report) is associated with a particular end-customer who is authorized to receive an entitlement token, whether the current firmware on a RoT (e.g., identified in the attestation report) is secure (e.g., without any known security vulnerabilities). In some embodiments, the policy criteria may also call for one or more levels of approval. In some embodiments, for example, the issuance of an entitlement token may be condition on the approval of an application engineer, customer service agent, and/or other representative of the component manufacturer. In some embodiments, the token provisioning system may prompt a representative for their approval (e.g., by sending the representative an entitlement token approval request), who may provide their approval through the token provisioning system. If the token provisioning system is able to verify that the one or more policy criteria are satisfied, it may proceed with generating an entitlement token (e.g., at sub-operation 356). If not, the attestation report (or attestation report transcript) may be discarded by the token provisioning system and processing of the attestation report may be aborted (e.g., with the method 300 returning to sub-operation 352 to process a next attestation report). In some embodiments, the process may be repeated for each attestation report returned to the BMC (e.g., for each attestation report in an attestation report collection).

In some embodiments, upon successful verification of an attestation report and satisfaction of the applicable policy criteria (e.g., at sub-operations 352 and 354), at sub-operation 356, the token provisioning system (e.g., using processing logic thereof) may generate an entitlement token for a RoT, allowing the RoT to take certain action(s) with respect to a component that it secures. In some embodiments, the parameters of the entitlement token that is generated may be established by an entitlement token policy, which for example, may specify the software and/or features that may be used on a component (e.g., of certain end-customers, in certain computing systems, under certain conditions, etc.). In some embodiments, the token provisioning system may issue different types of entitlement tokens, which may authorize and/or enable a RoT to take different action(s). By way of example, in some embodiments, the token provisioning system may issue a software authorization token, authorizing and/or enabling a RoT to affect a change in the software on a component it secures. In some embodiments, for example, the token provisioning system may issue a software authorization token authorizing and/or enabling a RoT to install certain software (e.g., a custom firmware image, a software tool, or other software object) onto the component it secures (e.g., onto memory thereof) and/or allow the component to load and execute the software once installed (e.g., to boot from the custom firmware image). In some embodiments, for example, the token provisioning system may include a cryptographic key in the software authorization token that was not previously known to the RoT, which can be used by the RoT to verify whether particular software can be trusted (e.g., so that it may be safely installed and/or loaded and executed by a component). In some embodiments, for example, the token provisioning system may include a non-production key (e.g., a non-production public key), which the RoT may be able to use to verify non-production software (e.g., debug software, debug tools, etc.) signed with the non-production key (e.g., using a corresponding non-production private key). As another example, in some embodiments, the token provisioning system may issue a feature configuration token authorizing and/or enabling a RoT to affect a change in the features provided by software on a component it secures (e.g., to unlock or enable one or more features on the component it secures). In some embodiments, for example, the token provisioning system 340 may issue a feature configuration token identifying one or more features of a software object, which may already be present on the component (e.g., features within a production firmware image), for the RoT to make available for use (e.g., after the entitlement token has been installed by the RoT).

In some embodiments, the entitlement token may include a number of additional parameters, which may operate to restrict a lifetime and/or scope of the entitlement tokens use. In some embodiments, for example, the token provisioning system may include one or more identity and/or state measurements from the attestation report, which may serve to bind the entitlement token to a particular RoT and component and/or a particular state thereof. In some embodiments, the token provisioning system may include an authentication challenge that was included in the attestation report, as an authentication response, which the RoT may attempt to verify before the entitlement token may be installed and/or used.

In some embodiments, at sub-operation 358, the token provisioning system (e.g., using processing logic thereof) may sign an entitlement token, for example, using a cryptographic key that is already known to, or verifiable by, the RoT to which it is being issued. In some embodiments, for example, the token provisioning system may sign the entitlement token with a production key (e.g., a production private key), which the RoT 315 may be able to verify (e.g., using a production non-private key). In some embodiments, for example, the token provisioning system may compute a message digest over the entitlement token using a hashing algorithm (e.g., using an MD5, SHA1, SHA356, or other hashing algorithm), which the token provisioning system may encrypt using the production key (e.g., using the private production key). In some embodiments, the token provisioning system may append the resulting encrypted message digest to the entitlement token to sign the entitlement token. In some embodiments, the entitlement token generation and signature process (e.g., sub-operations 356 and 358) may be repeated for each attestation report that is successfully verified and/or for which the applicable policy criteria is satisfied (e.g., at operation 350).

In some embodiments, once all attestation reports have been processed and appropriate entitlement tokens have been generated and signed (e.g., at operation 350), at operation 360, the token provisioning system (e.g., using processing logic thereof) may provide the entitlement tokens back to the BMC for installation on corresponding RoTs. In some embodiments, the token provisioning system (e.g., using processing logic thereof) may aggregate multiple entitlement tokens (e.g., once all attestation reports in an attestation report collection have been processed and appropriate entitlement tokens have been generated and signed) to generate an entitlement token collection, which may be provided back to the BMC for disaggregation and installation on respective RoTs.

FIG. 4 illustrates a flow diagram of an example method 400 for installing entitlement tokens, according to at least one embodiment. In some embodiments, method 400 may involve a token provisioning system providing an entitlement token (or entitlement token collection) to a computing system for installation on corresponding RoTs thereof (e.g., for which the entitlement token is intended). In some embodiments, the token provisioning system may provide the entitlement tokens (or entitlement token collections) directly to a BMC of the computing system, while in other embodiments, it may provide them to a software distribution system to be included in a software update package that is provided to the BMC for installation. The operations of method 400 may be performed by processing logic of the token provisioning system, the software distribution system, the RoTs of the computing system, and/or one or more other components thereof (e.g., by processing logic of the token provisioning system 440, software distribution system 450, computing system(s) 410, and/or BMCs 413 or RoTs 415 of FIG. 1).

In some embodiments, at operation 410, a token provisioning system (e.g., using processing logic thereof) may provide an entitlement token (or entitlement token collection) to a computing system for installation on corresponding RoTs thereof (e.g., for which the entitlement token is intended). In some embodiments, for example, the token provisioning system (e.g., using processing logic thereof) may provide the entitlement token (or entitlement token collection) to a software distribution system, which may include the entitlement token collection within a software update package that may then be distributed to a BMC of the computing system for installation. In some embodiments, the token provisioning system may identify one or more software objects (e.g., firmware images) for the software distribution system to include in the software update package for installation by the BMC (e.g., on the BMC itself and/or the components it manages). In some embodiments, for example, the token provisioning system may identify one or more software objects that the entitlement token (or entitlement token collection) may authorize and/or enable RoTs of the computing system to install and/or permit a component secured by the RoTs to use.

In some embodiments, at operation 412, the software distribution system (e.g., using processing logic thereof) may generate a software update package that includes the entitlement token (or entitlement token collection) provided by the token provisioning system along with one or more software objects, which may have been identified by the token provisioning system (e.g., at operation 410). In some embodiments, at operation 414, the software distribution system (e.g., using processing logic thereof) may provide the software update package to a BMC of the computing system for installation thereby. In some embodiments, the BMC may provide a software update service to help facilitate the distribution and installation of software onto components of computing system managed thereby. In some embodiments, the software distribution system may invoke the software update service by sending a message to the interface and may include a software update package as part the message.

In some embodiments, the software update service provided by the BMC may operate in accordance with the PLDM standard (e.g., including the PLDM for Firmware Update Specification). In such embodiments, the software distribution system may generate a software update package (e.g., at operation 412) that conforms to the PLDM standard. A PLDM software update package (or PLDM package), for example, may include a package header along with one or more software objects (e.g., firmware images). The package header may include a header information portion (e.g., describing the package version, date, etc.), component identifier records (describing the components, including downstream components, the update is intended for), package content information (e.g., describing the software images contained within the package, including for example, their classification, offset, size, and version), and a checksum. In some embodiments, the entitlement token (or entitlement token collection) received from the token provisioning system may be included as a “dummy” software object intended for a “dummy” component, which a BMC may be able to identify as such. In some embodiments, for example, a special component identifier (e.g., a specific UUID) and/or software object identifier (e.g., 0xDEAD or 47005) may be used in the PLDM package header to indicate that a software object is an entitlement token (or entitlement token collection).

In some embodiments, at operation 420, upon receipt of a software update package (e.g., via a request issued to the software update service), the BMC (e.g., using processing logic thereof) may attempt to process the software update package (e.g., using a PLDM handler thereof). In some embodiments, operation 420 may involve one or more suboperations (illustrated in FIG. 4 using dashed lines). In some embodiments, the BMC may examine the software update package to determine if an entitlement token (or entitlement token collection) is included therein. In some embodiments, for example, at sub-operation 422, the BMC (e.g., using processing logic thereof) may parse a package header to identify a dummy software object within the package that comprises the entitlement token (or entitlement token collection). In some embodiments, for example, the entitlement token (or entitlement token collection) may be identified with a special component identifier (e.g., a specific dummy component UUID) and/or as a special software object identifier (e.g., 0xDEAD or 47005) within the package header. In some embodiments, the BMC may extract the identified software object (e.g., based on associated package information in the header, such as a package offset and object size), comprising the entitlement token (or entitlement token collection), for further processing (e.g., at operation 430). In some embodiments, the BMC may examine the software update package to determine if an entitlement token (or entitlement token collection) is included therein and may extract and process the entitlement token (or entitlement token collection) (e.g., at sub-operation 422) before processing the rest of the software update package (e.g., before installing any other software objects contained therein) (e.g., at operation 450).

In some embodiments, at operation 430, the BMC token provisioning system (e.g., using processing logic thereof) may process each entitlement token (or entitlement token collection) that is extracted from the software update package (e.g., at operation 422). Where entitlement tokens are provided in an entitlement token collection, the BMC may parse the entitlement token collection and extract and process the individual entitlement tokens contained therein (e.g., sequentially and/or in parallel).

In some embodiments, operation 430 may involve one or more suboperations (illustrated in FIG. 4 using dashed lines). In some embodiments, for example, at sub-operation 432, the BMC (e.g., using processing logic thereof) may process a received entitlement token to determine a RoT for which it is intended and provide it to the identified RoT for installation. In some embodiments, the BMC may have recorded (or cached) the identity of the RoTs from which attestation reports were received (e.g., maintaining a mapping of a globally unique device identifier of a RoT and a serial number of the RoT and/or a component it secures). In some embodiments, the BMC may parse an entitlement token that is received and extract a serial number specified therein (e.g., of a RoT and/or a component it secures). The BMC may match the extracted serial number to a corresponding device identifier (e.g., from the mapping that was recorded) to identify the RoT for which the entitlement token should be provided for installation.

In some embodiments, at sub-operation 434, the BMC (e.g., using processing logic thereof) may issue an entitlement token installation command to the identified RoT and provide the entitlement token to the RoT for installation thereby (e.g., as part of the entitlement token installation command). In some embodiments, for example, where the BMC and RoT communicate using the MCTP protocol, the entitlement token installation command may be issued by sending a corresponding MCTP message, for example, a vendor defined message (VDM), which may include the entitlement token as part of the message payload. In some embodiments, the process (e.g., operation 430) may be repeated for each entitlement token provided to the BMC (e.g., for each entitlement token in an entitlement token collection).

In some embodiments, at operation 440, the RoT (e.g., using processing logic thereof) may attempt to verify the entitlement token and, if successfully verified, attempt to install the entitlement token. In some embodiments, operation 440 may involve one or more suboperations (illustrated in FIG. 4 using dashed lines). In some embodiments, for example, at sub-operation 442, a RoT (e.g., using processing logic thereof) may attempt to verify an entitlement token that is received (e.g., as part of a token installation command issued by BMC) to determine whether it should be processed further (e.g., installed by the RoT at sub-operation 444). In some embodiments, for example, a RoT (e.g., using processing logic thereof) may verify that the entitlement token can be trusted, is intended for the RoT, is valid, and/or is otherwise appropriate for use by the RoT.

In some embodiments, for example, an entitlement token may have been cryptographically signed by the token provisioning system when it was issued, for example, using a cryptographic key known to, or verifiable by, the RoT (e.g., a production key of the manufacturer, which may have been provided to the RoT when the RoT and/or component it secures was first manufactured or placed into production). In some embodiments, at sub-operation 442, the RoT (e.g., using processing logic thereof) may attempt to verify the digital signature of the entitlement token to establish its trustworthiness, or lack thereof, for example, using one or more cryptographic key(s) stored on the RoT (e.g., in a secure memory thereof, for instance, within a key store therein), which may include the corresponding production key (e.g., the corresponding public production key). In some embodiments, for example, the RoT may compute a message digest from the entitlement token (e.g., over the entitlement token data excluding the signature) using a hashing algorithm (e.g., using an MD5, SHA1, SHA456, or other hashing algorithm). The RoT may decrypt the digital signature using the cryptographic key(s) stored on the RoT 415, the results of which may be compared to the computed message digest to determine if they match. If the signature is successfully verified (e.g., if a result does match), the RoT may process the entitlement token further (e.g., at sub-operation 442). If the signature cannot be verified, the RoT may discard the entitlement token and processing of the entitlement token may be aborted (e.g., with the method 400 returning to sub-operation 442 to process a next entitlement token).

In some embodiments, at sub-operation 442, the RoT (e.g., using processing logic thereof) may attempt to verify one or more additional parameters included in the entitlement token. In some embodiments, for example, an entitlement token may include one or more identity and/or state parameters (e.g., from the attestation report based upon which it was issued by the token provisioning system). The RoT may compare the parameter values provided in the entitlement token to its identity and/or current state to determine if they match. If the identity and/or state parameters are successfully verified (e.g., if they match the identity and/or current state of the RoT), the RoT may process the entitlement token further (e.g., at sub-operation 442). If the identity and/or state parameters are not successfully verified, the RoT may discard the entitlement token and processing of the entitlement token may be aborted (e.g., with the method 400 returning to sub-operation 442 to process a next entitlement token).

In some embodiments, an entitlement token may include an authentication response (e.g., an authentication challenge from the attestation report based upon which it was issued), which at sub-operation 442, the RoT (e.g., using processing logic thereof) may compare to a current authentication challenge of the RoT to determine if they match. If the authentication response is successfully verified (e.g., if it matches a current authentication challenge of the RoT), the RoT may process the entitlement token further (e.g., at sub-operation 444). If the authentication response is not successfully verified, the RoT 415 may discard the entitlement token and processing of the entitlement token may be aborted (e.g., with the method 400 returning to sub-operation 442 to process a next entitlement token). In some embodiments, if the RoT 415 is able to successfully verify the entitlement token it may proceed with processing the entitlement token further (e.g., with installing the entitlement token).

In some embodiments, upon successful verification of an entitlement (e.g., at sub-operation 432), at sub-operation 444, a RoT (e.g., using processing logic thereof) may attempt to install an entitlement token. In some embodiments, a RoT may only allow a single entitlement token to be installed at a time, and a RoT (e.g., using processing logic thereof) may check if an entitlement token is already installed, before attempting to install (another) entitlement token. In some embodiments, if an existing entitlement token is not detected, the RoT may proceed with attempting to install the entitlement token (e.g., at sub-operation 444).

In some embodiments, the process for installing an entitlement token may depend on a type of the entitlement token. In some embodiments, a RoT may determine a type of the entitlement token (e.g., based on a flag or field within a header thereof) and process the entitlement token accordingly. In some embodiments, for example, where the entitlement token is a software authorization token, the RoT may parse the software authorization token and extract and store the cryptographic key included therein (e.g., in a secure memory of the RoT, for example, within a key store therein). The RoT may be able to use the cryptographic key thereafter, for example, to verify a software object for installation and/or to allow the component to load and/or execute the software object (e.g., to boot from a debug firmware or load and execute a debug tool). In some embodiments, the RoT may store the software authorization token (e.g., in a non-volatile memory thereof) and may parse and extract the cryptographic key from the software authorization token each time the RoT attempts to verify a software object for installation and/or allow the component to load and/or execute a software object. In some embodiments, where the entitlement token is a feature configuration token, the RoT may parse the feature configuration token and determine what features are identified therein and may configure (e.g., enable or disable) use of the identified features thereafter. In some embodiments, the RoT may store the feature enablement token (e.g., in a non-volatile memory thereof) and may parse the feature configuration token to determine what features are to be configured upon each boot or power cycle of the RoT and/or a component it secures.

In some embodiments, at sub-operation 446, the RoT (e.g., using processing logic thereof) may notify the BMC as to the success and/or failure of the RoT in verifying and/or installing the entitlement token. In some embodiments, for example, where the BMC and RoT communicate using the MCTP protocol, the RoT may send a corresponding MCTP message, for example, a VDM, in response, which may include a status code indicating success or failure (and in some cases, a specific error or reason for failure). In some embodiments, the entitlement token verification and installation process (e.g., operation 440) may be repeated for each entitlement token that is provided to a RoT for installation (e.g., as part of an entitlement token installation command, at sub-operation 434).

In some embodiments, after all entitlement tokens have been processed, at operation 450, the BMC (e.g., using processing logic thereof) may process the remaining software objects in the software update package. In some embodiments, for example, the BMC may parse the software update package to identify the software objects intended for one or more components managed by the BMC. In some embodiments, the BMC may extract the identified software objects and provide them to appropriate RoTs for installation on the RoTs or components they secure. In some embodiments, operation 450 may involve one or more suboperations (illustrated in FIG. 4 using dashed lines). In some embodiments, for example, at sub-operation 454, the BMC (e.g., using processing logic thereof) may issue a software installation or update command (a software installation command) to a RoT, directing the RoT to install a software object (e.g., on the RoT itself or a component it secures). In some embodiments, the BMC may provide the software object as part of the software installation command.

In some embodiments, in response to receiving a software object for installation (e.g., as part of a software installation command issued by the BMC), at operation 460, a RoT (e.g., using processing logic thereof) may attempt to verify a digital signature of the software object to ensure that it can be trusted using one or more cryptographic keys stored therein. In some cases, for example, the software object (e.g., a "secure" firmware update) may be signed with a production key, which may have been provided to the RoT when it or a component it secures was first manufactured or placed into production. In other cases, the software object (e.g., a custom debug firmware, helpful debug tool, etc.) may be signed with a non-production key (e.g., a debug key), which for example, may have been provided to the RoT in a software authorization token installed thereon. In some embodiments, if the software object is successfully verified, the RoT may proceed with installation, for example, by storing the software object in memory (e.g., of the RoT or a component it secures) for use by the component thereafter (e.g., by the RoT or a component it secures). In some embodiments, at operation 464, a RoT (e.g., using processing logic thereof) may notify the BMC as to the success or failure of the verification and/or installation, for example, in a response message sent to the BMC. In some embodiments, at operation 466, the BMC (e.g., using processing logic thereof) may notify the software distribution system and/or token provisioning system as to the success or failure of installing the software update package (including any entitlement tokens therein), for example, in a response message sent to the token provisioning system.

In some embodiments, the BMC (e.g., using processing logic thereof) may disable background copy on a RoT before attempting to install a software object or a particular type thereof (e.g., before installing a firmware image), for example, by issuing a background copy disable request. In some embodiments, disabling background copy on a RoT may prevent the RoT from installing a software object onto a particular element of memory, for example, a secondary memory storing a fallback firmware image (e.g., a production signed firmware). If for some reason, installation of a firmware image (e.g., a debug firmware) to a primary memory fails, it may still be possible to fall back to (e.g., to boot from) the firmware image in the secondary memory. In some embodiments, for example, where the BMC and RoT communicate using the MCTP protocol, background copy may be disabled by sending a corresponding MCTP message, for example, a vendor defined message (VDM). In some embodiments, in response to receiving a background copy disable request from BMC, a RoT (e.g., using processing logic thereof) may provide a response indicating whether background copy was (or was not) successfully disabled. In some embodiments, for example, where the BMC and RoT communicate using the MCTP protocol, the RoT may send a corresponding MCTP message, for example, a VDM, in response. In some embodiments, if background copy is not successfully disabled, the BMC may not issue a software installation command to the RoT (e.g., at sub-operation 454).

In some embodiments, once an entitlement token is no longer needed (e.g., once testing and validation by an end-customer is complete), at operation 472, a BMC (e.g., using processing logic thereof) may issue an entitlement token removal request, requesting a RoT to uninstall an entitlement token. In some embodiments, upon receipt of the token removal request, a RoT (e.g., using processing logic thereof) may identify any tokens in memory and reverse the installation process with respect thereto. In some embodiments, for example, a RoT may remove a corresponding cryptographic key that had been stored, or disable one or more features that had been enabled, and remove the entitlement token from memory. In some embodiments, for example, a BMC may be configured to issue a token removal request to each of the RoTs it manages, upon receipt of a software update (e.g., with production signed software) that does not contain an entitlement token collection, at operation 470, which may be understood as indicating that entitlement tokens are no longer needed (e.g., that testing and validation is complete) and that the system components are to be restored to a secure state (e.g., a production state). In some embodiments, at operation 474, the RoT (e.g., using processing logic thereof) may notify the BMC as to the success or failure of the token removal, for example, in a response sent thereto. In some embodiments, at operation 476, the BMC may notify the software distribution system and/or token provisioning system regarding the same, for example, in a response message sent to the software distribution system and/or token provisioning system.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms “a” and “an” and “the” and similar referents in context of describing disclosed embodiments (especially in context of following claims) are to be construed to cover both singular and plural, unless otherwise indicated herein or clearly contradicted by context, and not as a definition of a term. Terms “comprising,” “having,” “including,” and “containing” are to be construed as open-ended terms (meaning “including, but not limited to,”) unless otherwise noted. “Connected,” when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term “set” (e.g., “a set of items”) or “subset” unless otherwise noted or contradicted by context, is to be construed as a nonempty collection comprising one or more members. Further, unless otherwise noted or contradicted by context, term “subset” of a corresponding set does not necessarily denote a proper subset of corresponding set, but subset and corresponding set may be equal.

Conjunctive language, such as phrases of form “at least one of A, B, and C,” or “at least one of A, B and C,” unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases “at least one of A, B, and C” and “at least one of A, B and C” refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term “plurality” indicates a state of being plural (e.g., “a plurality of items” indicates multiple items). In at least one embodiment, number of items in a plurality is at least two, but can be more when so indicated either explicitly or by context. Further, unless stated otherwise or otherwise clear from context, phrase “based on” means “based at least in part on” and not “based solely on.”

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit (“CPU”) executes some of instructions while a graphics processing unit (“GPU”) executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., “such as”) provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
- receiving, by at least one processing device, an attestation report corresponding to a root of trust of a computing system, wherein the attestation report is cryptographically signed using a private key unique to the root of trust;
- verifying, by the at least one processing device, the attestation report using a public key corresponding to the private key;
- based at least upon successful verification of the attestation report, issuing, by the at least one processing device, an entitlement token for the root of trust allowing the root of trust to take one or more actions with respect to a system component secured by the root of trust;
- updating a token collection to include the entitlement token and at least one other entitlement token issued for at least one other root of trust of the computing system, wherein the at least one other entitlement token differs from the entitlement token; and
- transmitting the token collection to the computing system for installation of the entitlement token by the root of trust and the at least one other entitlement token by the at least one other root of trust.

2. The method of claim 1, wherein the attestation report includes a signing certificate of the root of trust, the method further comprising:
- determining the public key corresponding to the private key using the signing certificate.

3. The method of claim 1, wherein the attestation report includes at least one state measurement, and wherein the entitlement token that is issued comprises the at least one state measurement.

4. The method of claim 1, wherein the attestation report includes at least one state measurement, and wherein verifying the attestation report comprises:
- determining whether the at least one state measurement satisfies a security policy.

5. The method of claim 4, wherein the at least one state measurement comprises at least one of a device identifier or a firmware version, and wherein the security policy indicates whether at least one of the device identifier or the firmware version is authorized to receive an entitlement token.

6. The method of claim 1, further comprising:
- transmitting a request to the computing system for the attestation report from the root of trust, wherein the request comprises an authentication challenge and wherein the authentication challenge is included in the attestation report that is cryptographically signed.

7. The method of claim 1, further comprising:
- transmitting the entitlement token to the computing system for installation by the root of trust; and
- receiving a confirmation that the entitlement token was successfully installed by the root of trust.

8. The method of claim 1, further comprising:
- issuing a request to the root of trust to remove the entitlement token; and
- receiving a confirmation that the entitlement token was successfully removed by the root of trust.

9. The method of claim 1, further comprising:

receiving another attestation report corresponding to the at least one other root of trust of the computing system, wherein the another attestation report is cryptographically signed using another private key unique to the at least one other root of trust;

verifying the another attestation report using another public key corresponding to the another private key;

based at least upon successful verification of the another attestation report, issuing the at least one other entitlement token to the at least one other root of trust allowing the at least one other root of trust to effect a change in a software of another system component secured by the at least one other root of trust.

10. The method of claim 1 wherein the one or more actions comprise at least one of: effecting a change in a software of the system component, or configuring a feature provided by the software of the system component.

11. A system comprising:

a memory device; and a processing device coupled to the memory device, wherein the processing device is configured to perform operations comprising:

receiving an attestation report corresponding to a root of trust of a computing system, wherein the attestation report is cryptographically signed using a private key unique to the root of trust;

verifying the attestation report using a public key corresponding to the private key;

based at least upon successful verification of the attestation report, issuing an entitlement token for the root of trust allowing the root of trust to take one or more actions with respect to a system component secured by the root of trust;

updating a token collection to include the entitlement token and at least one other entitlement token issued for at least one other root of trust of the computing system, wherein the at least one other entitlement token differs from the entitlement token; and transmitting the token collection to the computing system for installation of the entitlement token by the root of trust and the at least one other entitlement token by the at least one other root of trust.

12. The system of claim 11, wherein the attestation report includes a signing certificate of the root of trust, and wherein the processing device is further configured to perform operations comprising:

determining the public key corresponding to the private key from the signing certificate.

13. The system of claim 11, wherein the attestation report includes at least one state measurement, and wherein the entitlement token that is issued comprises the at least one state measurement.

14. The system of claim 11, wherein the attestation report includes at least one state measurement, and wherein the verifying the attestation report comprises:

determining whether the at least one state measurement satisfies a security policy.

15. The system of claim 11, wherein the processing device is further configured to perform operations comprising:

transmitting a request to the computing system for the attestation report corresponding to the root of trust, wherein the request comprises an authentication challenge and wherein the authentication challenge is included in the attestation report that is cryptographically signed.

16. A non-transitory computer-readable medium comprising instructions, which when executed by a processing device, cause the processing device to perform operations comprising:

receiving an attestation report corresponding to a root of trust of a computing system, wherein the attestation report is cryptographically signed using a private key unique to the root of trust;

verifying the attestation report using a public key corresponding to the private key;

based at least upon successful verification of the attestation report, issuing an entitlement token for the root of trust allowing the root of trust to take one or more actions with respect to a system component secured by the root of trust;

updating a token collection to include the entitlement token and at least one other entitlement token issued for at least one other root of trust of the computing system, wherein the at least one other entitlement token differs from the entitlement token; and transmitting the token collection to the computing system for installation of the entitlement token by the root of trust and the at least one other entitlement token by the at least one other root of trust.

17. The non-transitory computer-readable medium of claim 16, wherein the attestation report includes a signing certificate of the root of trust, and wherein the operations further comprise:

determining the public key corresponding to the private key from the signing certificate.

18. The non-transitory computer-readable medium of claim 16, wherein the attestation report includes at least one state measurement, and wherein the entitlement token that is issued comprises the at least one state measurement.

19. The non-transitory computer-readable medium of claim 16, wherein the attestation report includes at least one state measurement, and wherein the verifying the attestation report further comprises:

determining whether the at least one state measurement satisfies a security policy.

20. The non-transitory computer-readable medium of claim 16, wherein the operations further comprise:

transmitting a request to the computing system for the attestation report corresponding to the root of trust, wherein the request comprises an authentication challenge and wherein the authentication challenge is included in the attestation report that is cryptographically signed.

* * * * *